US010642926B2

(12) United States Patent
Ledohowski et al.

(10) Patent No.: US 10,642,926 B2
(45) Date of Patent: May 5, 2020

(54) METHODS AND SYSTEMS RELATING TO CONTEXT-SPECIFIC WRITING FRAMEWORKS

(71) Applicants: Lindy Ledohowski, Ottawa (CA); Rueban Balasubramaniam, Ottawa (CA)

(72) Inventors: Lindy Ledohowski, Ottawa (CA); Rueban Balasubramaniam, Ottawa (CA)

( * ) Notice: Subject to any disclaimer, the term of this patent is extended or adjusted under 35 U.S.C. 154(b) by 0 days.

(21) Appl. No.: 15/573,522

(22) PCT Filed: May 11, 2016

(86) PCT No.: PCT/CA2016/000133
§ 371 (c)(1),
(2) Date: Nov. 13, 2017

(87) PCT Pub. No.: WO2016/179683
PCT Pub. Date: Nov. 17, 2016

(65) Prior Publication Data
US 2018/0357209 A1   Dec. 13, 2018

Related U.S. Application Data

(60) Provisional application No. 62/159,416, filed on May 11, 2015.

(51) Int. Cl.
*G06F 17/22* (2006.01)
*G09B 19/00* (2006.01)
(Continued)

(52) U.S. Cl.
CPC ........ *G06F 17/2229* (2013.01); *G06F 17/248* (2013.01); *G06F 17/274* (2013.01);
(Continued)

(58) Field of Classification Search
CPC ...................................................... G06F 17/22
See application file for complete search history.

(56) References Cited

U.S. PATENT DOCUMENTS 9,336,774 B1 * 5/2016 Kurzweil ................ G10L 15/00
2007/0239433 A1 * 10/2007 Chaski .................... G06F 17/27
(Continued)

*Primary Examiner* — James J Debrow
(74) *Attorney, Agent, or Firm* — Rosenberg, Klein & Lee

(57) ABSTRACT

All writing falls within certain conventions of genre. Each memo, scholarly essay, report, reflection or other piece of prose is governed by conventions that inform or dictate structure. The logical progression and organizational structure of writing, e.g. business writing or scholarly writing, can take many forms. Understanding how the movement of thought is managed through a piece of writing has a profound impact on its overall cogency and ability to impress and convince. However, mastering these takes time and practice. Accordingly, it would be beneficial to provide students and other users with interactive, context-specific writing frameworks that, once the content type and the context have been established, presents a framework that allows students or other users to enter the required content in a structured, contextually-defined, interactive manner in real time as they establish individual facts, arguments, counterpoints etc.

19 Claims, 15 Drawing Sheets

(51) Int. Cl.
*G06Q 50/00* (2012.01)
*G09B 5/14* (2006.01)
*G06F 17/24* (2006.01)
*G06F 17/27* (2006.01)

(52) U.S. Cl.
CPC ............... *G06Q 50/01* (2013.01); *G09B 5/14* (2013.01); *G09B 19/00* (2013.01)

(56) References Cited

U.S. PATENT DOCUMENTS

2011/0300520 A1* 12/2011 Harris et al. ............. G09B 7/00
2015/0039297 A1* 2/2015 Greer et al. ............ G06F 17/27

* cited by examiner

METHODS AND SYSTEMS RELATING TO CONTEXT-SPECIFIC WRITING FRAMEWORKS

CROSS-REFERENCE TO RELATED APPLICATIONS

This patent application claims the benefit of priority as a 35 U.S.C 371 National Phase application of World Patent Application PCT/2016/000133 entitled "Method and Systems relating to Context Specific Writing Frameworks" filed May 11, 2016 which itself claims the benefit of priority from U.S. Provisional Application 62/159,416 filed May 11, 2015 the entire contents of each being incorporated herein by reference.

FIELD OF THE INVENTION

This invention relates to content generation and structure, more particularly to the provisioning of interactive, context-specific writing frameworks.

BACKGROUND OF THE INVENTION

All writing falls within certain conventions of genre. A memo, scholarly essay, report, reflection or other piece of prose are all governed by conventions that inform their structure. For the purposes of this invention, we will consider two main categories of writing: business and scholarly. The logical progression and organizational structure of business and/or scholarly writing can take many forms. Understanding how the movement of thought is managed through a piece of writing has a profound impact on its overall cogency and ability to impress and convince.

However, today, successful written communication is waning. A comprehensive report co-authored by the Conference Board, Corporate Voices for Working Families, the Partnership for 21st Century Skills, and the Society for Human Resource Management found that when it comes to written communication, "80.9 percent of employer respondents report high school graduate entrants as 'deficient.' More than half (52.7 percent) say Written Communications, which includes writing memos, letters, complex reports clearly and effectively, 'very important' for high school graduates' successful job performance." Written communication is "very important," yet a majority of students and workers are "deficient" when it comes to performing well in written tasks.

Amongst the factors leading to this are: decreasing use of a variety of written forms in class and within homework, information overflow students face when searching using the Internet, inadequate instruction, and various writing pathologies and anxieties. The leap from writing a few sentences to drafting and refining a structured essay with the required elements is massive and one that today's students— both domestic and international—are left to make blindly, contributing to the US cost of $3.7 billion/year to offer remedial courses to get post-secondary students up to the appropriate level and US businesses another $3.1 billion/year to provide additional writing support and education to salaried employees.

Whilst within the prior art there are a significant number of patents relating to cognitive memory techniques for the student or user to aid memorization and recall of factual information, technologies for brain-storming or mind-mapping ideas, and tools for content search and acquisition, techniques for provisioning interactive, context-specific writing frameworks for essays and other forms of structured content are lacking. Similarly, within word processing tools and search engines etc. the overwhelming prior art with respect to templates relates to standardized templates such as letter, envelope, fax cover letter, etc. Even here these templates fail as the first time user may well understand that the fields marked address, name, date etc. require completion but that large blank space after "Dear XX" is still a void without guidance on structure or interactivity in terms of real-time prompts and guidance particular to a given context or genre.

Accordingly, it would be beneficial to provide students and other users with interactive, context-specific writing frameworks that, once the content type and the context have been established, presents a framework that allows students or other users to enter the required content in a structured, contextually-defined, interactive manner in real time as they establish individual facts, arguments, counterpoints etc.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating content generation and more particularly to the provisioning of interactive, context-specific writing frameworks. Embodiments of the invention may, for example, be provided through an interactive web-application that pre-structures student work and provides for educator and/or supervisor interaction, feedback, reviews, and group management.

In accordance with an embodiment of the invention there is provided a method of presenting to a user upon an electronic device comprising at least a display and a microprocessor a predetermined interactive writing framework for generating an item of content in a sequentially structured manner with the data for generating the item of content entered non-sequentially by the user into the predetermined interactive writing framework, the predetermined interactive writing framework established in dependence upon a context selected by the user.

In accordance with an embodiment of the invention there is provided a method of presenting to a first user upon an electronic device comprising at least a display and a microprocessor an item of content, the item of content generated by a second user using a predetermined interactive writing framework for generating the item of content in a sequentially structured manner with the data for generating the item of content entered non-sequentially by the user into the predetermined interactive writing framework, the predetermined interactive writing framework established in dependence upon a context selected by the second user, and providing to the first user upon the electronic device the ability to at least one review, rate, grade, and comment upon the item of content.

In accordance with an embodiment of the invention there are provided computer instructions stored within a non-volatile, non-transitory memory for execution by a microprocessor, wherein the computer instructions cause a process to be executed comprising receiving from a user an indication of a context associated with an item of content;
presenting to a user upon an electronic device comprising at least a display and the microprocessor a predetermined interactive writing framework for generating the item of content in a sequentially structured manner from data entered non-sequentially by the user into the predetermined interactive writing framework, the predetermined interactive writing framework established in dependence upon the context;

receiving from the user a plurality of first selections relating to user generated content to form a first predetermined portion of the item of content and in association with each first selection of the first plurality of selections content data;

receiving from the user a plurality of second selections relating to user generated content to form a second predetermined portion of the item of content, each second selection of the plurality of second selections associated with an item of predetermined linking data selected by the user; and generating the item of content in dependence upon the predetermined interactive writing framework, the content data and the linking data.

In accordance with an embodiment of the invention there are provided computer instructions stored within a non-volatile, non-transitory memory for execution by a microprocessor, wherein the computer instructions cause a process to be executed comprising:

a) opening a software application upon an electronic device comprising at least a display and the microprocessor, the software application providing a graphical user interface (GUI) to the user in respect of their generating an item of content;

b) retrieving from a memory data relating to a predetermined interactive writing framework based upon selection by a user of a context of an item of content and a document type of the item of content to be prepared by the user using the software application, the predetermined interactive writing framework for generating the item of content in a sequentially structured manner from data entered by the user non-sequentially;

c) displaying to the user within the GUI a first predetermined portion of the predetermined interactive writing framework;

d) receiving from the user a first selection within the first predetermined portion of the predetermined interactive writing framework;

e) receiving from the user a second selection within a second predetermined portion of the predetermined interactive writing frame displayed to the user in dependence upon the first selection;

f) determining whether the second selection meets a first predetermined criterion or a second predetermined criterion, wherein
upon determining that the second selection meets the first predetermined criterion the software application receives content data entered by the user and stores the content data in association with framework data relating to the first selection and the second selection;
upon determining that the second selection meets the second predetermined criterion the software application stores at least one of the second selection and linking data in association with framework data relating to the first selection;

g) repeating steps (c) to (e) until a first selection relates to a predetermined function; and h) performing the predetermined function.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 6 depicts exemplary user profile interface screens within a software application supporting CONFRASAPs (CONFRASAPs) according to an embodiment of the invention;

DETAILED DESCRIPTION

Figure 1:
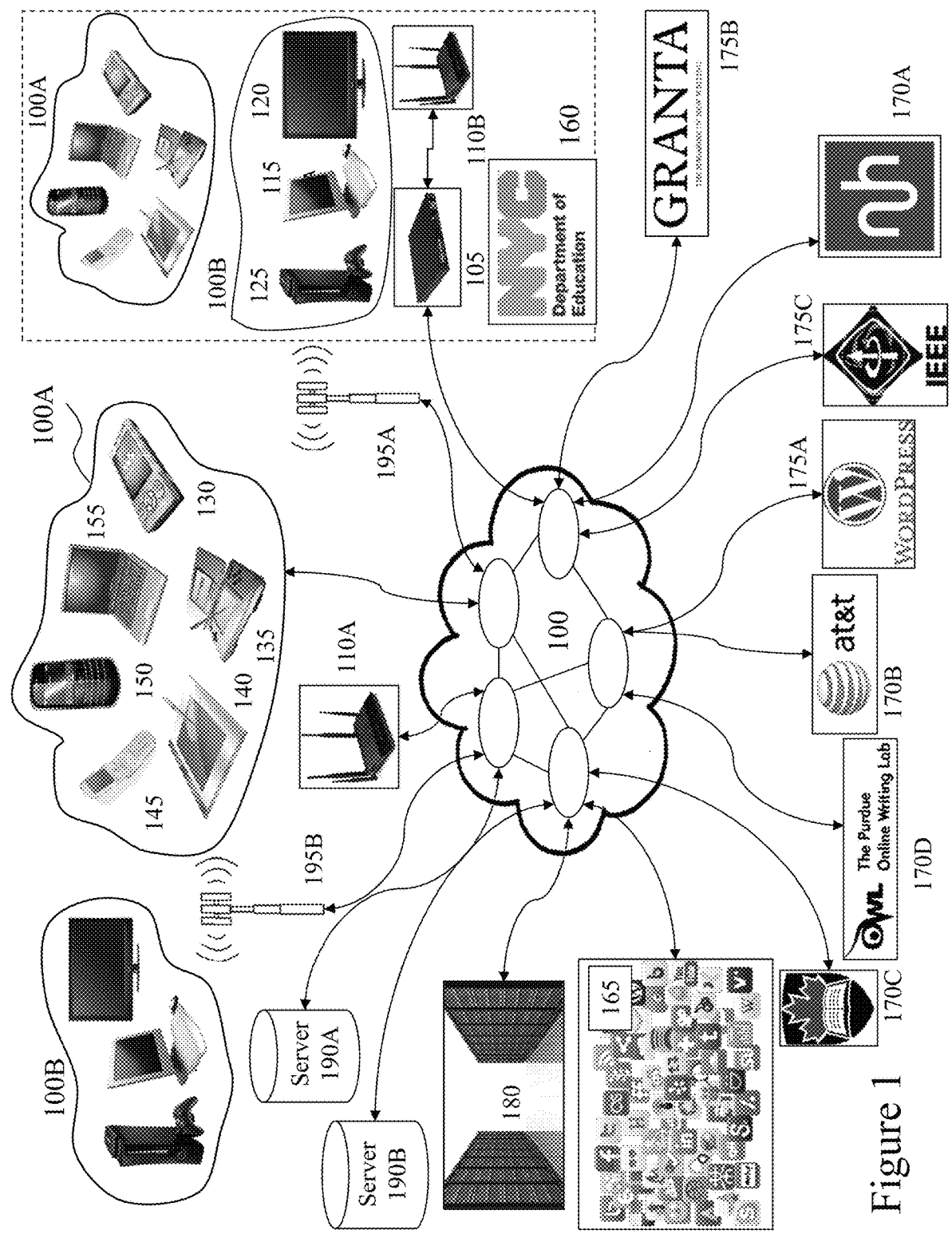
FIG. 1 depicts an example of a network environment within which embodiments of the invention are employed and exploited.

The present invention is directed to content generation and structure and more particularly to the provisioning of interactive, context-specific writing frameworks.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims. Further, whilst the exemplary embodiment(s) primarily refer to the context-specificity of a liberal arts persuasive essay, it would be understood by one of skill in the art that other contexts, document classifications, and subject and/or subject matter may exploit embodiments of the invention.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors therefore form part of the wider PED grouping but are more directly associated with the user and may include, but not be limited to, smart watches, activity trackers, smart glasses, sensors, and immersive/non-immersive augmented reality systems.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals who monitor, acquire, store, transmit, edit, process and analyse information/data either locally or remotely to the user wherein by their engagement with a service provider, third party provider, enterprise, social network, social media etc. via a dashboard, web service, website, software plug-in, software application, graphical user interface etc. accesses and uses a CONFRASAP according to an embodiment of the invention with respect to, for example, electronic content. This includes, but is not limited to, private individuals, employees of organizations and/or enterprises, members of community organizations, members of charity organizations, men, women, children, teenagers, and animals. In its broadest sense the user may further include, but not be limited to, software systems, mechanical systems, robotic systems, android systems, etc. that may be characterised as having the ability to monitor, acquire, store, transmit, edit, process and analyse information/data and associate this to a field or fields within a CONRASAP.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

"Biometric" information as used herein may refer to, but is not limited to, data relating to a user characterised by data relating to a subset of conditions including, but not limited to, their environment, medical condition, biological condition, and physiological condition. Accordingly, such biometric information may include, but not be limited to, physiological characteristics related to the shape and/or condition of the body wherein examples may include, but are not limited to, fingerprint, facial geometry, baldness, and hand geometry. Biometric information may also include data relating to behavioral characteristics, including but not limited to, typing rhythm, gait, and voice.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

Reference to "content information" as used herein may refer to, but is not limited to, any combination of content features, content serving constraints, information derivable from content features or content serving constraints (referred to as "content derived information"), and/or information related to the content (referred to as "content related information"), as well as an extension of such information (e.g., information derived from content related information).

Reference to a "document" as used herein may refer to, but is not limited to, any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). In the context of the Internet, a common document is a Web page. Web pages often include content and may include embedded information (such as meta-information, hyperlinks, etc.) and/or embedded instructions (such as JavaScript, etc.). In many cases, a document has a unique, addressable, storage location and can therefore be uniquely identified by this addressable location such as a universal resource locator (URL) for example used as a unique address used to access information on the Internet.

"Document information" as used herein may refer to, but is not limited to, may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Referring to FIG. 1 there is depicted a network environment 100 within which embodiments of the invention may be employed supporting contextual framework systems, applications and platforms (CONFRASAPs) according to embodiments of the invention. Such CONFRASAPs, for example supporting multiple channels and dynamic content. As shown first and second user groups 100A and 100B respectively interface to a telecommunications network 100. Within the representative telecommunication architecture a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with Enterprise 160, e.g. New York City Department of Education, within which other first and second user groups 100A and 100B respectively are present. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 100A may form associations either through standards such as IEEE 802.15 and Bluetooth as well in an ad-hoc manner.

Also connected to the network 100 are Social Networks (SOCNETS) 165, publisher 170A, e.g. Notting Hill Press, telecom service provider 170B, e.g. AT&T™, academic institution 170C, e.g. Carleton University, academic support service 170D, e.g. Purdue University Online Writing Lab, online content service 175A, e.g. WordPress™, literary publication 175B, e.g. Granta, and scientific journal publisher 175C, e.g. Institution of Electrical and Electronic Engineers, as well as first and second servers 190A and 190B together with others, not shown for clarity. First and second servers 190A and 190B may host according to embodiments of the inventions multiple services associated with a provider of contextual framework systems and rating applications/platforms (CONFRASAPs); a provider of a SOCNET or Social Media (SOME) exploiting CONFRASAP features; a provider of a SOCNET and/or SOME not exploiting CONFRASAP features; a provider of services to PEDS and/or FEDS; a provider of one or more aspects of wired and/or wireless communications; an Enterprise 160 exploiting CONFRASAP features; license databases; content databases; image databases; content libraries; customer databases; websites; and software applications for download to or access by FEDs and/or PEDs exploiting and/or hosting CONFRASAP features. First and second primary content servers 190A and 190B may also host for example other Internet services such as a search engine, financial services, third party applications and other Internet based services.

Accordingly, a consumer and/or customer (CONCUS) may exploit a PED and/or FED within an Enterprise 160, for example, and access one of the first or second primary content servers 190A and 190B respectively to perform an operation such as accessing/downloading an application which provides CONFRASAP features according to embodiments of the invention; execute an application already installed providing CONFRASAP features; execute a web based application providing CONFRASAP features; or access content. Similarly, a CONCUS may undertake such actions or others exploiting embodiments of the invention exploiting a PED or FED within first and second user groups 100A and 100B respectively via one of first and second cellular APs 195A and 195B respectively and first Wi-Fi nodes 110A.

Figure 2:
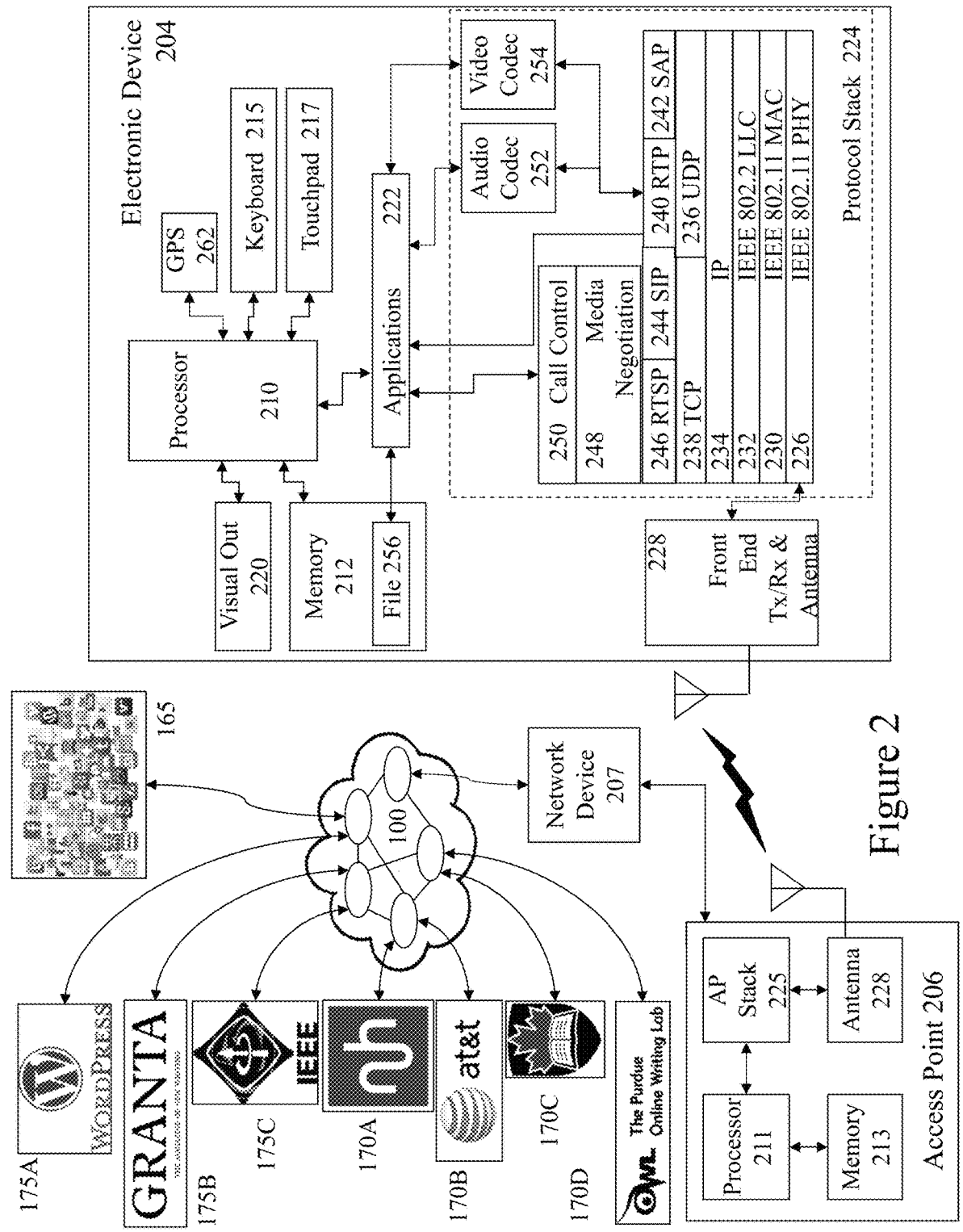
FIG. 2 depicts an example of a typical portable electronic device supporting employment and exploitation of embodiments of the invention as communicating with the network environment presented in FIG. 1.

Now referring to FIG. 2 there is depicted an electronic device 204 and network access point 207 supporting CONFRASAP features according to embodiments of the invention. Electronic device 204 may, for example, be a PED and/or FED and may include additional elements above and beyond those described and depicted. Also depicted within the electronic device 204 is the protocol architecture as part of a simplified functional diagram of a system 200 that includes an electronic device 204, such as a smartphone 155, an access point (AP) 206, such as first AP 110, and one or more network devices 207, such as communication servers, streaming media servers, and routers for example such as first and second servers 190A and 190B respectively. Network devices 207 may be coupled to AP 206 via any combination of networks, wired, wireless and/or optical communication links such as discussed above in respect of FIG. 1 as well as directly as indicated. Network devices 207 are coupled to network 100 and therein SOCNETS 165, publisher 170A, e.g. Notting Hill Press, telecom service provider 170B, e.g. AT&T™, academic institution 170C, e.g. Carleton University, academic support service 170D, e.g. Purdue University Online Writing Lab, online content service 175A, e.g. WordPress™ literary publication 175B, e.g. Granta, and scientific journal publisher 175C, e.g. Institution of Electrical and Electronic Engineers, as well as first and second servers 190A and 190B respectively, together with others, not shown for clarity.

The electronic device 204 includes one or more processors 210 and a memory 212 coupled to processor(s) 210. AP 206 also includes one or more processors 211 and a memory 213 coupled to processor(s) 210. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 204 may include an audio input element 214, for example a microphone, and an audio output element 216, for example, a speaker, coupled to any of processors 210. Electronic device 204 may include a video input element 218, for example, a video camera or camera, and a video output element 220, for example an LCD display, coupled to any of processors 210. Electronic device 204 also includes a keyboard 215 and touchpad 217 which may for example be a physical keyboard and touchpad allowing the user to enter content or select functions within one of more applications 222. Alternatively, the keyboard 215 and touchpad 217 may be predetermined regions of a touch sensitive element forming part of the display within the electronic device 204. The one or more applications 222 that are typically stored in memory 212 and are executable by any combination of processors 210. Electronic device 204 also includes accelerometer 260 providing three-dimensional motion input to the process 210 and GPS 262 which provides geographical location information to processor 210.

Electronic device 204 includes a protocol stack 224 and AP 206 includes a communication stack 225. Within system 200 protocol stack 224 is shown as IEEE 802.11 protocol stack but alternatively may exploit other protocol stacks such as an Internet Engineering Task Force (IETF) multimedia protocol stack for example. Likewise AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PHY module 226 that is coupled to one or more Front-End Tx/Rx & Antenna 228, an IEEE 802.11-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238.

Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206. Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230.

It would be apparent to one skilled in the art that elements of the electronic device 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Accordingly, as will be evident from the following description of a CONFRASAP according to an embodiment of the invention a user may access multiple information resources from their PED/FED in order to acquire and review content for incorporation within electronic content being generated by the user. This electronic content may be formed for a variety of reasons including, but not limited to, school education, university/college education, employment, career (e.g. author), and employment. Further, whilst the following description of a CONFRASAP according to an embodiment of the invention is directed to the preparation of an essay or essays by the user and their review either in draft or as part of educational requirements it would be evident that embodiments of the invention may be employed to provide users with contextually defined pedagogical frameworks based upon the user establishing initial boundary values. Such frameworks may relate to thesis, refereed journal articles, news articles, product bulletins, and essays.

Accordingly, a CONFRASAP to embodiments of the invention fill a critical gap between content acquisition (web and database searching) and formal word processing (final product) and operate as a digital text-structuring tool. As such CONFRASAP provides users with easy-to-use, plain-language framework for native-language content generation, e.g. argumentative essays, by providing the appropriate structure and framework, interactive prompts, transitions, etc. in a software tool featuring elements users are familiar with through drop down menus. CONFRASAP gives structural guidance in advance and during the content drafting process but whilst it is not primarily intended to be a content-editing and/or post-creation feedback generating tool embodiments of the invention may be integrated with or interface with such tools. A CONFRASAP may be provided with different user dashboards according to version, subscription, subscribing institution/enterprise, etc. For example, one dashboard variant may not allow for sharing/commenting on other content from other user whilst another may provide for such.

A CONFRASAP according to an embodiment of the invention may collect specific user information during the content generation, including, but not limited to, sources used in writing academic essays, scientific articles etc. Equally, within some environments a CONFRASAP according to an embodiment of the invention may interface to other third party software tools such as citation databases, plagiarism checker, web or desktop publishing tools, word processing software, cloud storage tools, and enterprise/institution portals.

Within the following descriptions in respect of FIGS. 3 to 6 a CONFRASAP is presented and described from the perspective of providing argumentative essay framework tools to user within educational environments as an example of interactive, context-specific writing frameworks according to embodiments of the invention. It would be evident that this is only an example of the application of a CONFRASAP according to an embodiment of the invention and is not intended to define or bound the scope of the use of embodiments of the invention. Similarly, the following description considers that there are two main levels of permissions to the CONFRASAP, or two different account types that are differentiated at the level of interactivity. The first is the CONFRASAP student permission allows for users of CONFRASAP looking for an efficient, technology-driven way to write/teach writing (such as, but not limited to, academic essays) where the general stumbling block is the issue of structure. Such "students" may include, but not be limited to, middle school students, high school students, college-level students, university undergraduates, university graduate and/or post-graduate students, correspondence students, distance learning students, private tutorial students, and web-based education students. The second is the CONFRASAP educator permission for users of CONFRASAP who are looking for an efficient, technology-driven way to teach academic essays and employ them within an educational environment as part of course requirements, marking, grading etc. Such "educators" may include but not be limited to, high school teachers, middle school teachers, university professors, university contract instructors/lecturers, university teaching assistants, and tutors. Outside of educational contexts, any writer is considered a "user" who may enter with first-level permissions (like a "student"), and a "manager" will have additional, second-level permissions (like an "educator").

Figure 3:
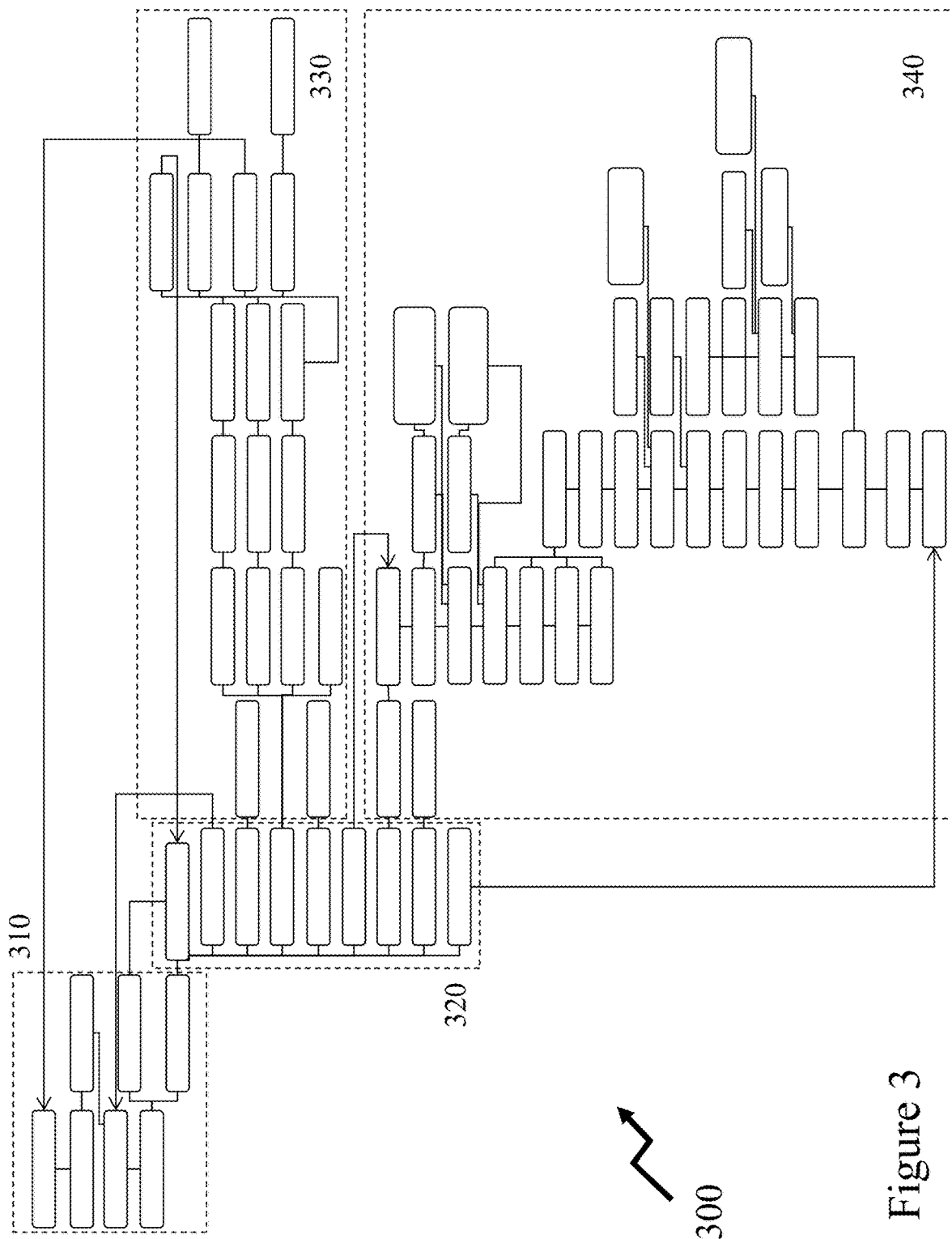
FIG. 3 depicts an architecture/process flow for a software application supporting CONFRASAPs according to an embodiment of the invention.
Figure 4A:
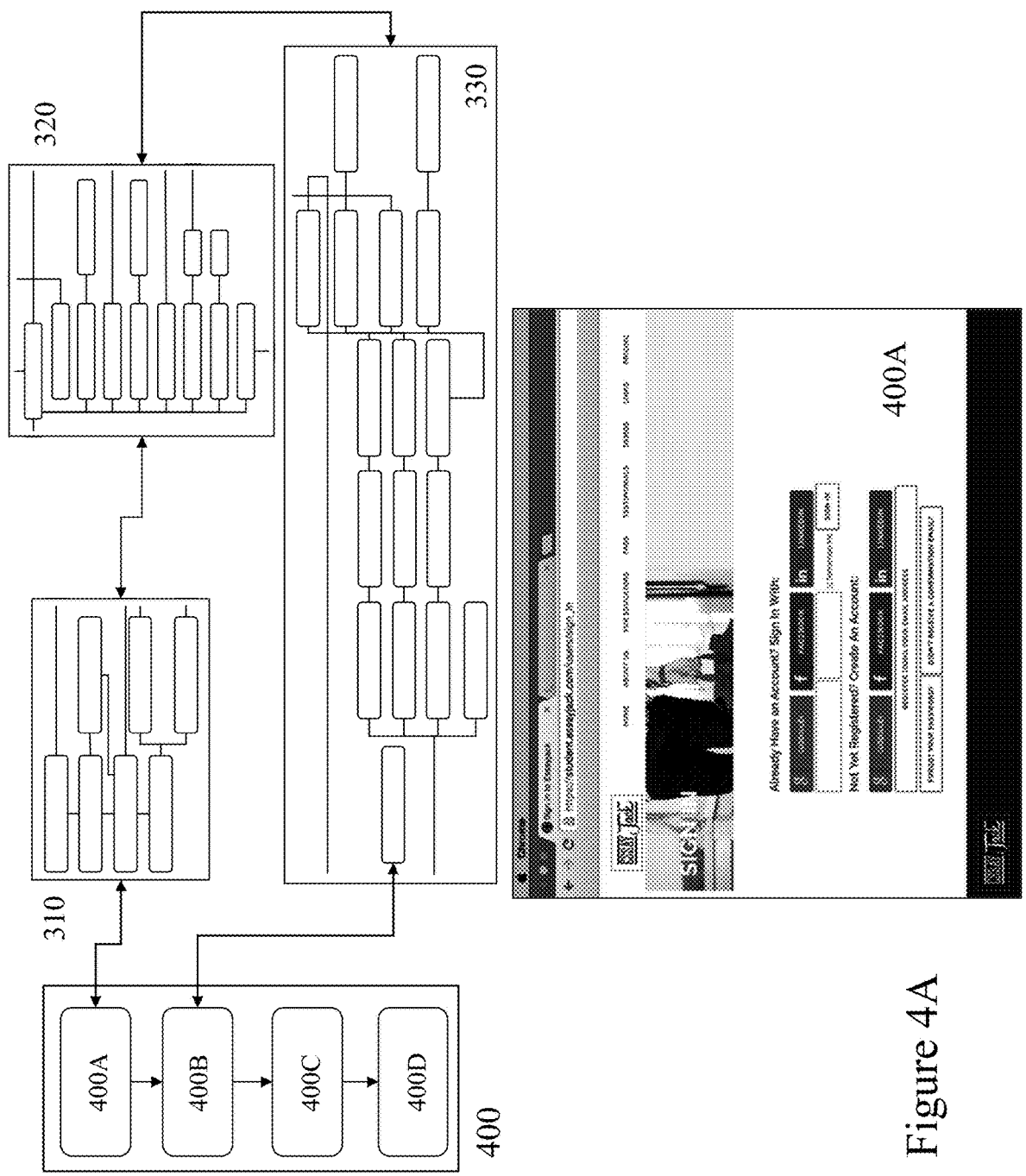
FIGS. 4A and 4B depict an architecture/process flow and exemplary interface screens presented to a user performing different steps or actions within a software application supporting CONFRASAPs according to the embodiment of the invention depicted in FIG. 3.
Figure 4B:
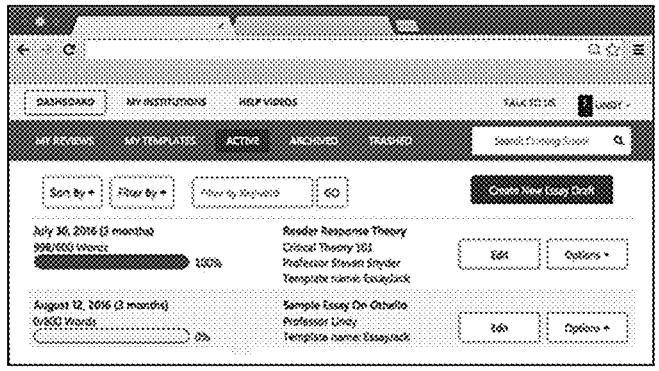
Figure 4B:
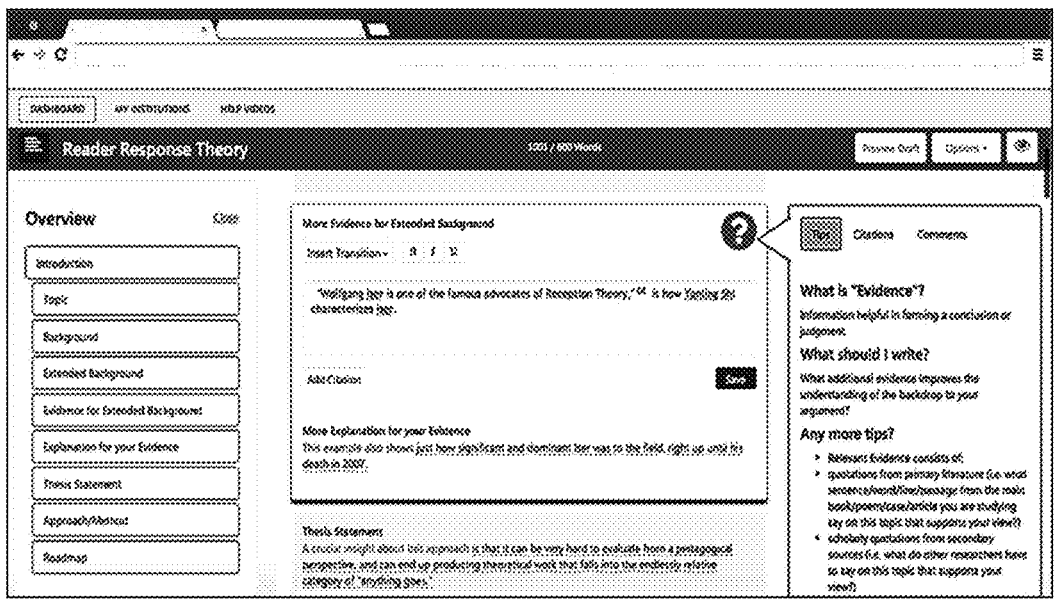
Figure 4B:
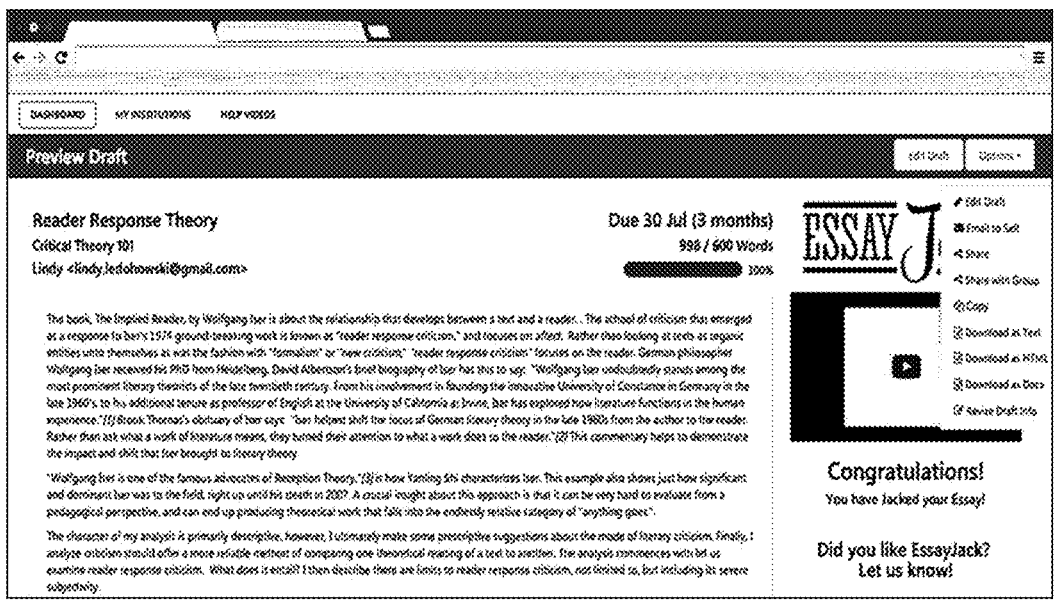
Figure 5:
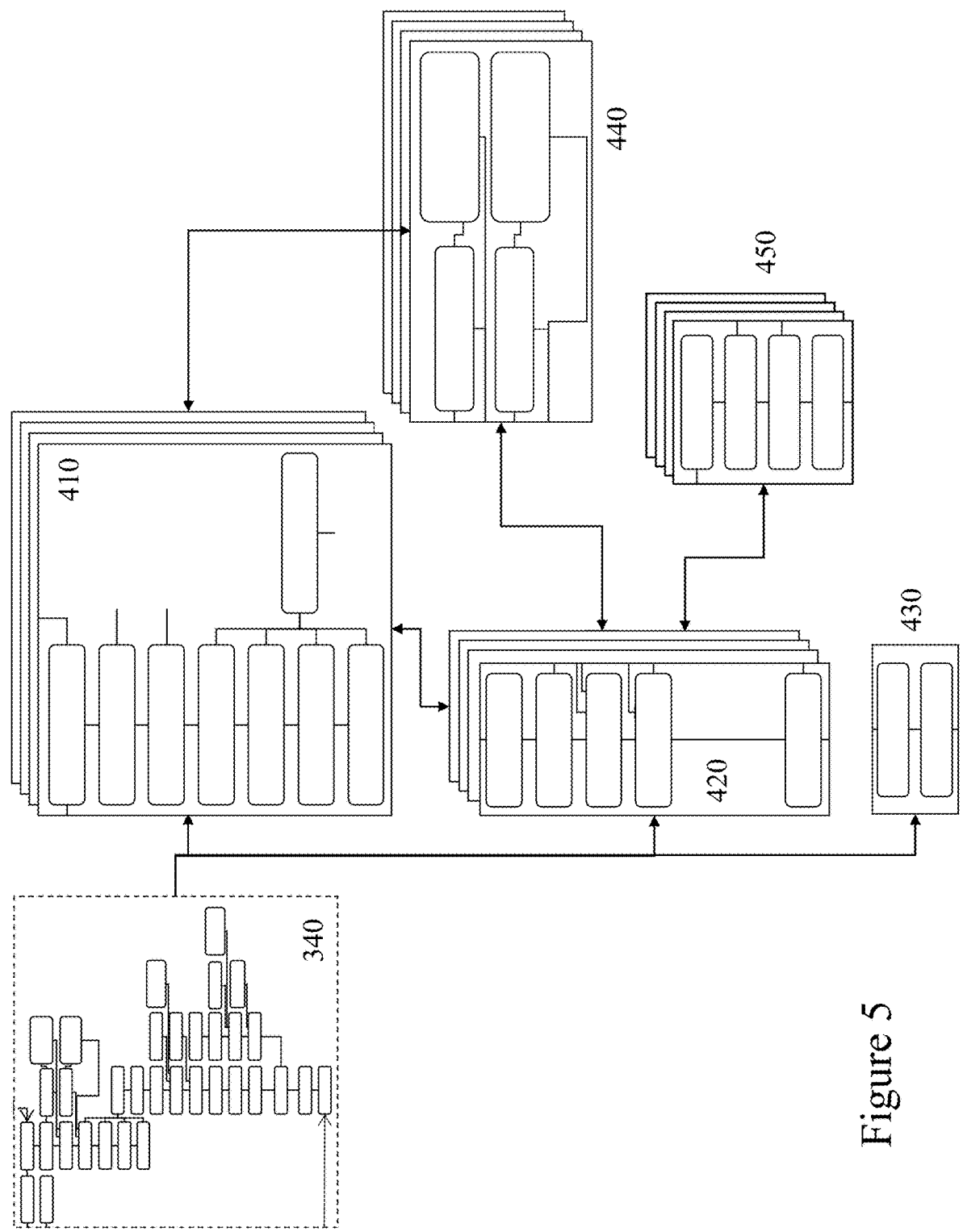
FIG. 5 depicts the architecture elements referred to as major and minor cards within the software application supporting CONFRASAPs according to an embodiment of the invention depicted in FIG. 3.
Figure 7A:
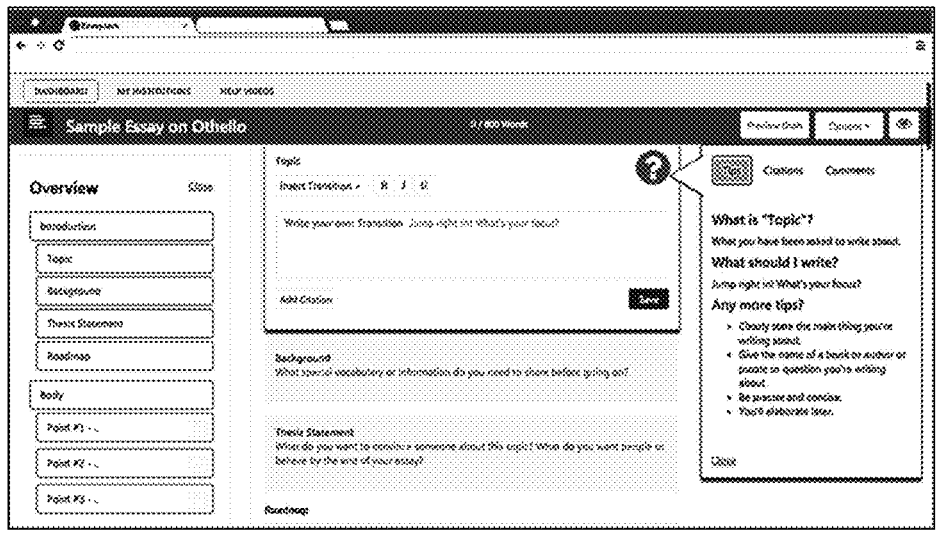
FIGS. 7A and 7B depict exemplary interface screens for establishing a feedback and review within a software application supporting CONFRASAPs according to an embodiment of the invention.
Figure 7A:
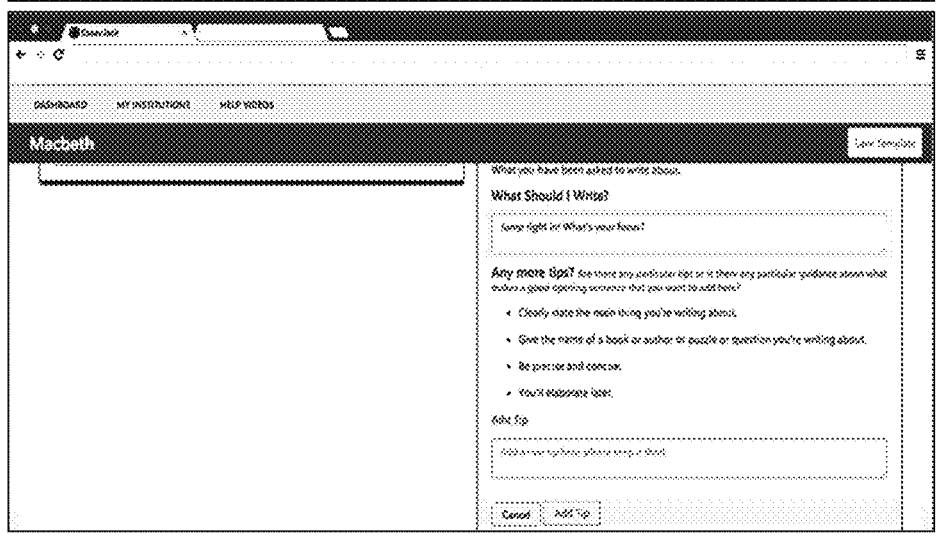
Figure 7A:
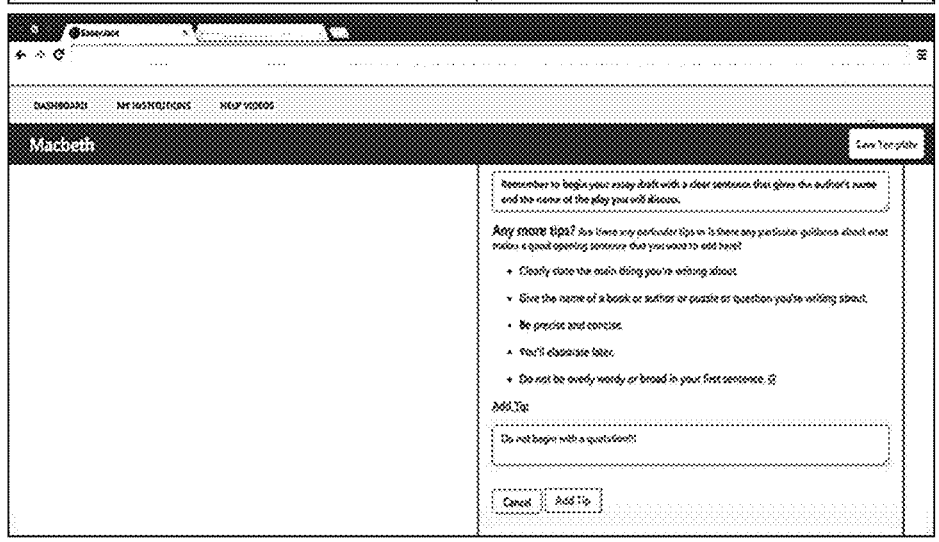
Figure 7B:
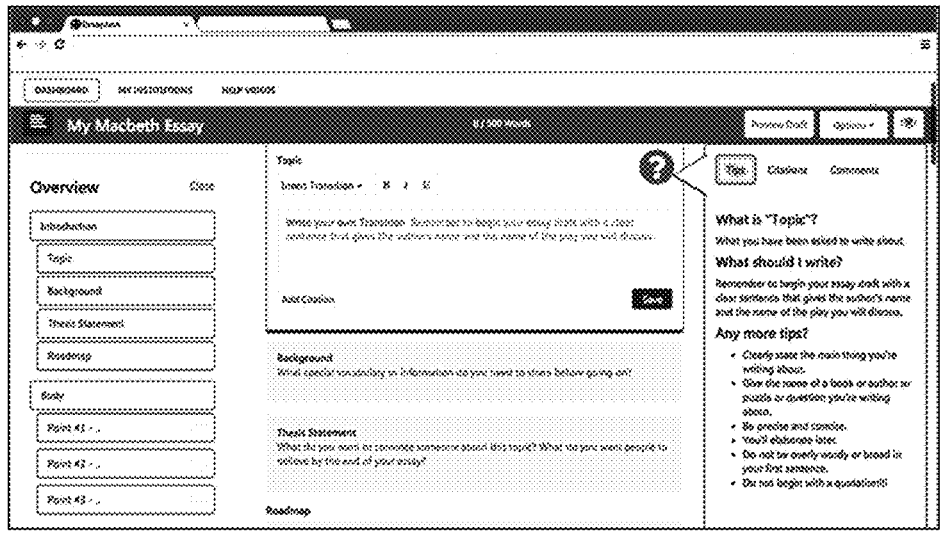
Figure 8A:
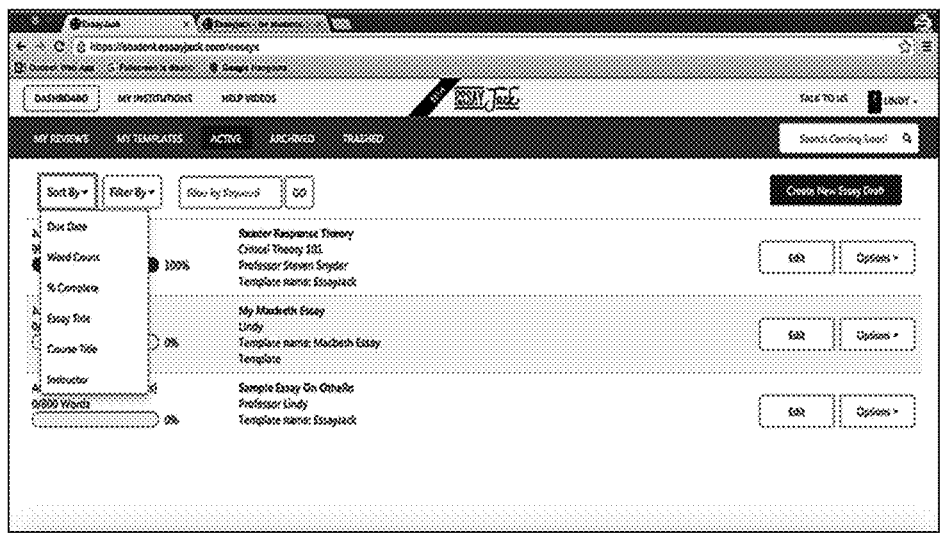
FIGS. 8A and 8B depict exemplary interface screens for a user customizing the context-specific framework to fit a given context within a software application supporting CONFRASAPs according to an embodiment of the invention.
Figure 8A:
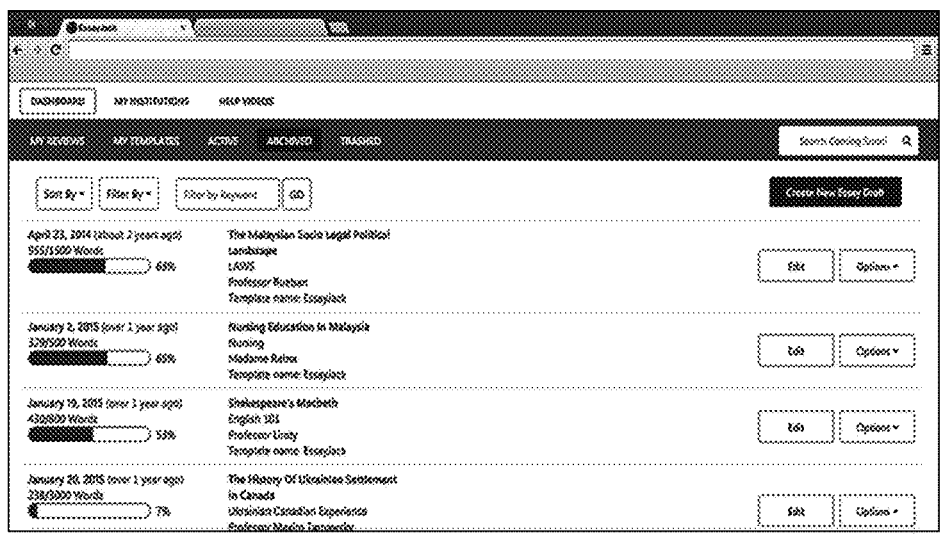
Figure 8B:
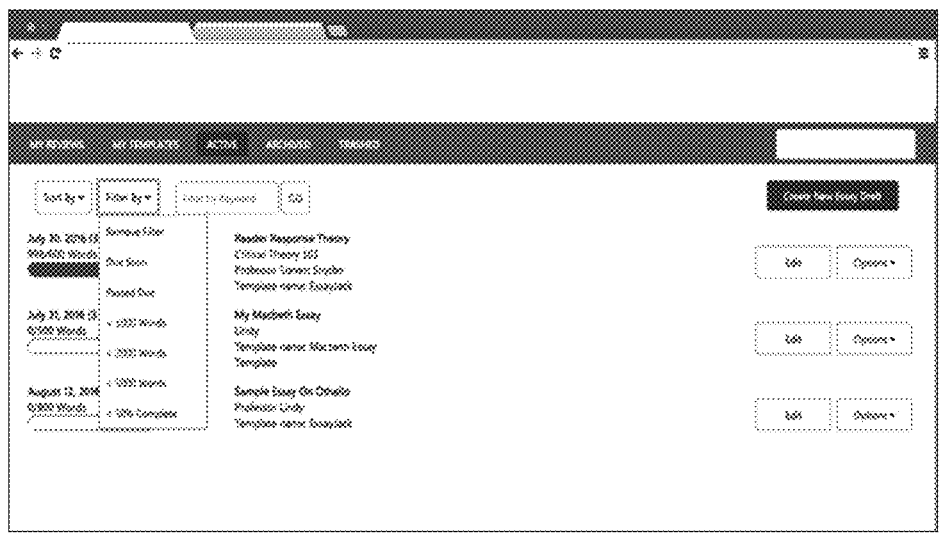
Figure 9A:
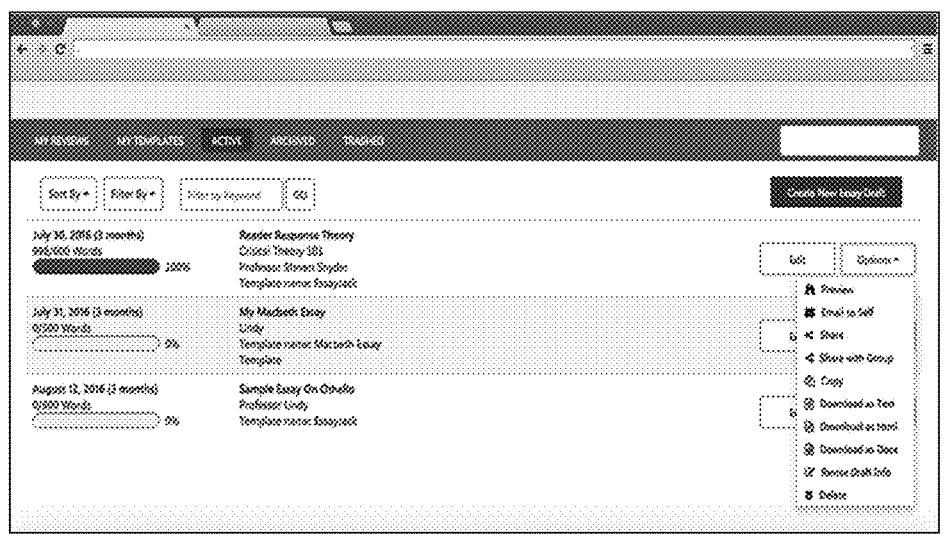
FIGS. 9A to 12B depict exemplary interface screens for a user performing different steps or actions within a software application supporting CONFRASAPs according to an embodiment of the invention.
Figure 9A:
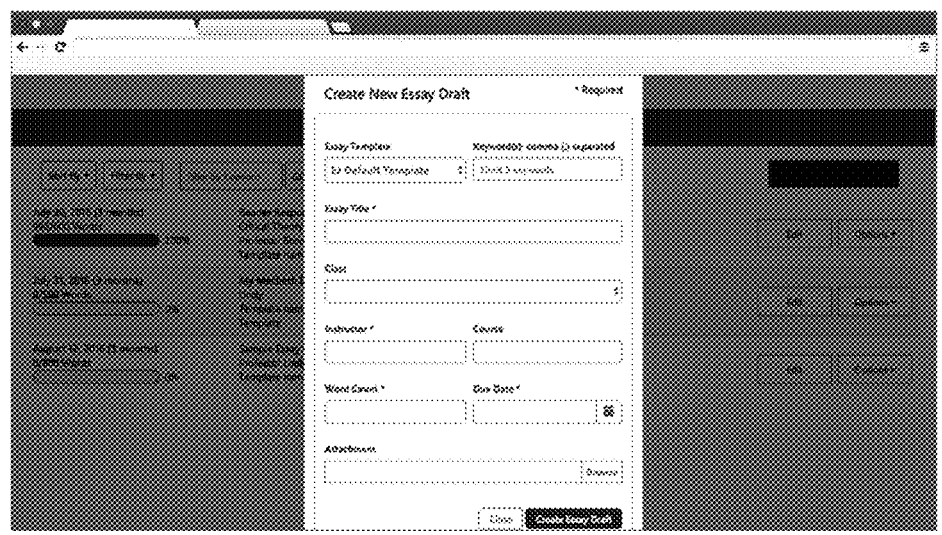
Figure 9B:
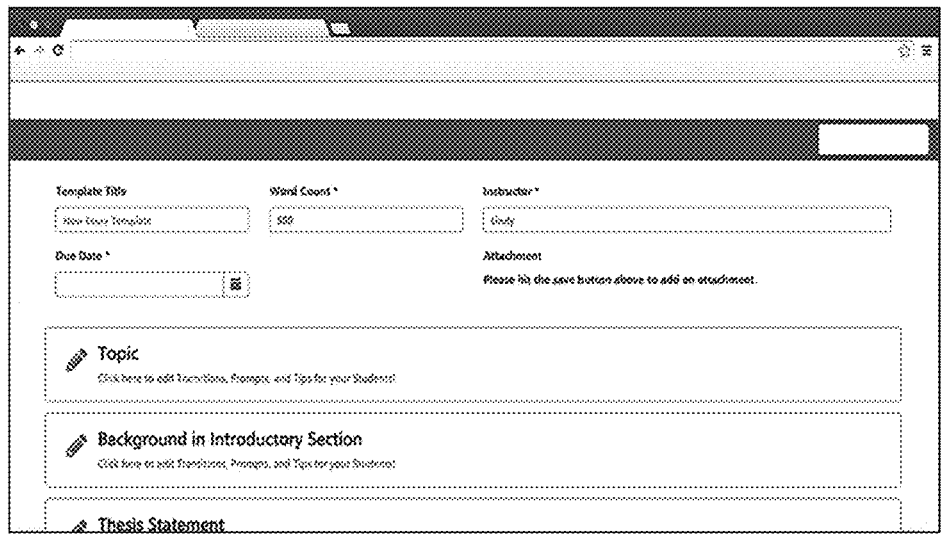

Referring to FIGS. 3 to 5 respectively, there are depicted an exemplary architecture and process images for a software application supporting CONFRASAPs according to an embodiment of the invention. As depicted in FIG. 3 the CONFRASAP progresses according to a process flow 300, comprising first to fourth process flows 310 to 340 respectively which are described and discussed below in respect of FIGS. 3, 4A and 4B respectively. These illustrate key features of a database model whilst exemplary user interface screens presented to users during their use of a CONFRASAP according to an embodiment of the invention which are subsequently depicted in FIGS. 6-12B respectively. Further, FIG. 5 depicts for a CONFRASAP according to an embodiment of the invention how a fourth process flow 340 as depicted in FIG. 3, which relates to the actual generation of the content and is itself composed of sub-process flows 410 to 450 respectively. These refer to the interactive, context-specific writing frameworks accessible within a CONFRASAP to a user.

Through these discussions it is important to remember that the CONFRASAP fulfills a number of structural requirements in order to achieve the required standard of excellence, usability, and acceptance including, but not limited, security, privacy, scalability, education management/sharing, social media linking, and data mining tools such as demographic data, citation data, and user analytics. CONFRASAPs accordingly may use multiple locations and methods to collect, store, collate, retrieve, and publish content. For simplicity of the following descriptions it is assumed that the data gathered relates to only three categories, demographic data, essay-related information (which has autogenerating consequences), and essay-related analytics & data. As depicted in FIG. 3 the CONFRASAP according to an embodiment of the invention may be configured as a process flow 300 based upon first to fourth process flows 310 to 340 respectively, which are:

First process flow 310 relating user accessibility, subscriptions, service level, etc.;
Second process flow 320 relating to activity management for the user;
Third process flow 330 relating to access rights of third parties etc. of content generated by the user; and
Fourth process flow 340, relating to the actual generation of the content.

FIG. 5 depicts the architecture elements within the software application supporting CONFRASAPs according to an embodiment of the invention depicted in the other figures. Relating to the profile differentiation in FIGS. 4A and 4B there are depicted a simplified flow 400 relating to student user functionality wherein the CONFRASAP is defined by four main pages 400A to 400D together with exemplary screen captures of these pages for a software application according to an embodiment of the invention. As depicted the first to fourth main pages 400A to 400D respectively comprise:

First main page 400A, depicted in FIG. 4A, which is a landing page from a uniform resource locator (URL) in a web based version for PEDs and/or FEDs or launch screen in desktop environments;
Second main page 400B, depicted in FIG. 4B, which is the main user dashboard providing the user with the main options available to them;
Third main page 400C, depicted in FIG. 4B, which is the main CONFRASAP editing page which, for example, may be a split screen with edit/create functions and toolbars etc. on the left hand side and hints, tips, preview, citation listing, etc. in the right hand side; and
Fourth main page 400D, depicted in FIG. 4B, which provides full preview options with menu options.

Within an educator flow, the educator may be depicted within alternate second to fourth main pages 400B to 400D and may in other embodiments of the invention also access the CONFRASAP through a different first main page 400A. The educator may alternatively see the same pages as a user. In either instance, the educator as a result of their permissions may be able to access extra pages and/or extra functions within a page and/or menu. For example, the educator may be provided with options relating solely to the commenting and/or rating generation in respect of a student submitted work or they may be provided with these plus the ability to perform customizing as discussed below in respect of embodiments of the invention.

Within the third main page 400C the user may be presented with an "Overview" menu that maintains its position, for example top left-hand corner, so that as the user scrolls down their piece of writing on this main editing page (third main page 400C), the Overview menu follows showing the user where in the piece of writing they are. The Overview allows users to drag & drop and reorder component parts of their piece of writing. The Overview operates as a macro-navigation tool, showing the piece of writing in its entirety, as component parts.

Figure 6:
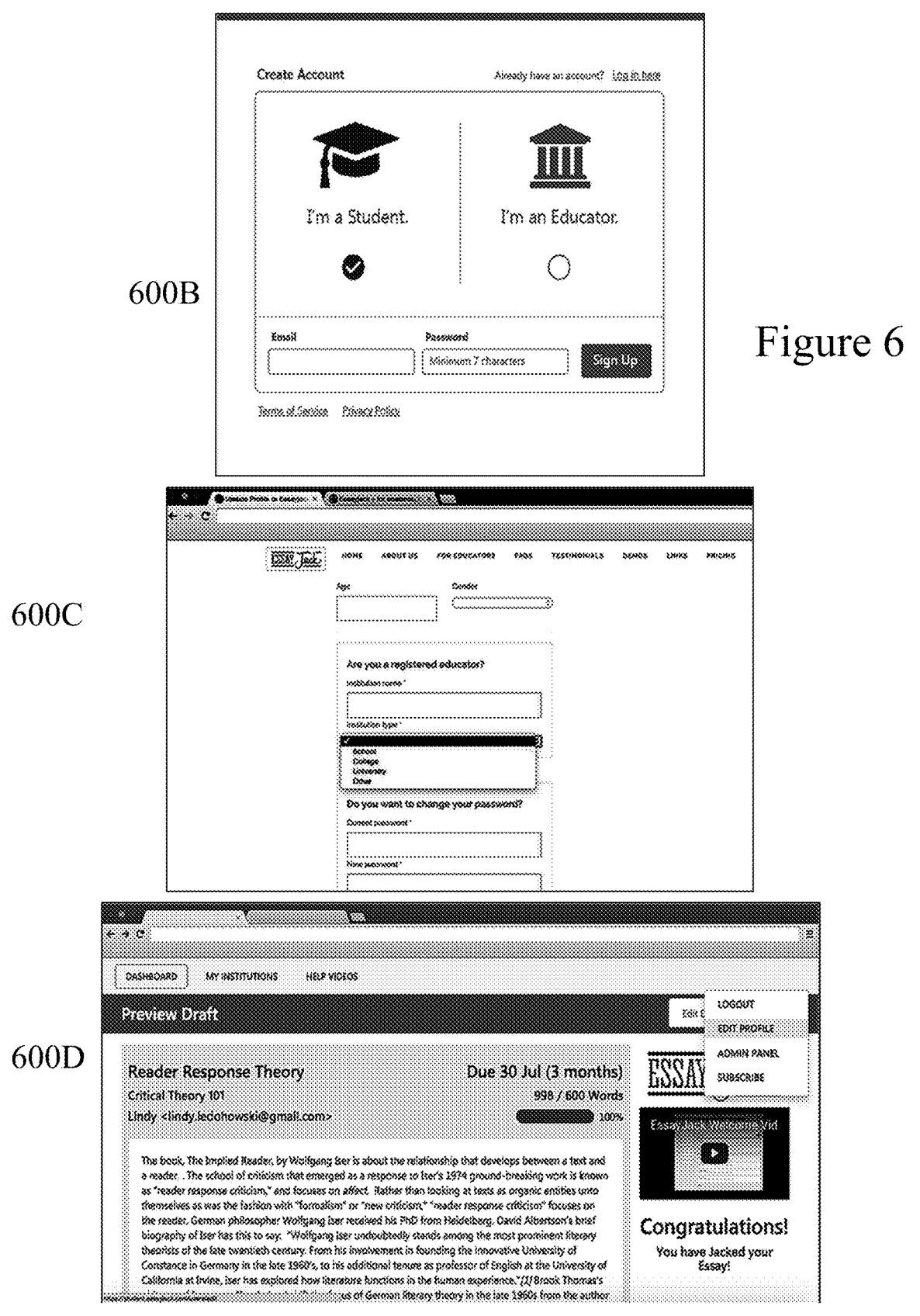

First process flow 310 as depicted in FIG. 6 relates to user accessibility, subscriptions, service level, etc. As such the user may access one or more process steps including, but not limited to, Initial Sign Up, Legal, Subscription (Pay), Profile, and Login.

Initial Sign Up: This may be provided, for example, institutionally or individually. In the former the educational institution obtains licenses for educators and/or students to access the CONFRASAP and either manages these themselves or has the CONFRASAP provider undertake this by tracking registrants using an institutional access to initially enter the system before generating their own profile. In the latter the user purchases their own subscription through one or more techniques as known in the art. Within the embodiment of the CONFRASAP presented the individual user may select from two subscription levels, simply referred to herein as "Student" and "Educator" where the latter provides access to sharing functionality, customizing templates, providing student feedback, and generating rubric-informed ratings for student work etc. in second process flow 320 as well as the remaining features of the CONFRASAP through third and fourth process flows 330 and 340 respectively. A "student" subscription provides only access to third and fourth process flows 330 and 340. In the institutional process the individual must still sign up through their institution due to legal requirements, analytics, etc. but simply does not have to pay for their individual account or alternatively they do but at a discounted rate for example.

In all instances, stringent legal requirements around protecting user privacy and security would be maintained due to the users providing information that can identify them individually. Each institution and each user would be subject to reviewing and accepting the CONFRASAP standard terms and conditions. Optionally, the institution may require users to sign additional terms and conditions in respect of policies relating to plagiarism, release of completed works to the institution, ownership of completed works etc. Such terms and conditions may be provided and accepted through techniques such as digital "click wrap agreement" etc. as known in the art.

Profile Set Up: Once a user is registered/licensed then they complete an individual profile which may be auto-populated using data entered during the payment process in some instances or retrieved from an institution database if as accessing the user enters a unique institution credential in addition to a generic institution credential, e.g. they initially access for example using a code provided by Carleton University and their student identity number with Carleton University. The profile data may include, but not be limited to, First Name, Last Name, Email Address, Location, Age, and Gender. Optionally, they may for institution licenses select either student and/or educator or this may be automatically defined via the unique institution credential. Optionally, where the user is issued a photographic institution credential they may be required to present this for the CONFRASAP to capture an image thereof. If the user selects "student" then may be asked to provide additional information including, but not limited to, Institution Type: (School/College/University/Other), Institution Name, Degree Type: (Diploma/Bachelors/Masters/Doctoral), and Area of Study. If the user selects "educator," then may be asked to provide additional information including, but not limited to, Educator Role (e.g. teacher/teaching assistant/ professor/tutor/home school), Institution Type: (School/College/University/Other), Institution Name, and Teaching Specialization. Optionally, the user may be able to upload an avatar, an image, or select an image for use in association with their profile as known in the art.

CONFRASAPs according to embodiments of the invention may therefore be based upon these profiles and gather user demographics/user patterns through data mining routines where such information may include, but not limited, to when do they access, from where do they access, how long the user stays logged in, do users stay focused on one essay at a time, how long do users spend on each section, when/how often do they go to the search engine, what websites/webpages they visit, what are the most common keywords associated with essays, what is the length of time spent on each essay from start to finish, what is the average rating student essays receive, is there improvement over time in student essay ratings, what citations can be correlated to keywords, etc.

In addition to allowing data mining plans, both to determine user behavior (life cycle of essays, time to completion, rating improvements etc.) as described above embodiments of the invention will also support aggregate data collection such as, for example, collating citations to keywords in order to develop more sophisticated search algorithms that allow for more precise linking of scholarly sources with the types of essays students actually write. Optionally, an Educator may similarly view the content submitted by a student in a form reflecting their entry within the CONFRASAP hierarchy/framework that the student employed as the Educator is seeking to verify adequate understanding of the topic/question etc.

Optionally, a completed item of content may be parsed by a plagiarism engine which may form part of the CONFRASAP or be accessed discretely either provided by the provider of the CONFRASAP or a third party provider. It would be evident that the parsing process may remove all elements that were "auto-populated" by the CONFRASAP such that only the text actually entered by the user is checked.

Second process flow 320 relates to activity management for the user in either educator or student modes where the user is drafting/generating content. As such this process flow may be displayed as a series of options to the user through a dashboard, for example "My Drafts Dashboard." Accordingly, the user is presented with a display of saved/in progress essays where by default the content is listed chronologically although the user be able to create "files" and/or "folders" etc. as known in the art for grouping content in a manner that makes sense to them. From this dashboard the user in addition to organizing their essays can also create, edit, delete, share with another individual (an educator), and preview. Educator account holders may be able to create customized essay templates to share with users, receive shared essays from users and provide span-specific commenting, offer rubric-informed ratings with customization for students, and enjoy all the student functionality.

Within the third process flow 330 relating to access rights of third parties etc. of content generated by the user the user can set-up sharing of content they are drafting and/or for subsequent review. The user can, for example, email a contextually-specific portion of the essay—the thesis statement—directly to any email address; the user can also share essays with educator-enabled users.

Fourth process flow 340, relates to the actual generation of the content and is itself composed of five sub-process flows 410 to 450 as depicted in FIG. 5. These refer to the interactive, context-specific writing frameworks (referred to herein as a COPE Frame) within the CONFRASAP as follows:

First sub-process flow 410 which relates to what the inventors refer to as a "Major Card" relating to "Introduction" and is itself one of a plurality of Major Cards each of which is composed of a plurality of "Minor Cards" wherein the Major Cards and Minor Cards are defined according to the COPE Frame the user is employing;

Second sub-process flow 420 is a series of sub-process flows each one relating to a Minor Card within a section of the COPE Frame defining, in this instance "Main Point", wherein a Minor Card can be associated with one or more Major Cards as defined per their respective first sub-process flow 410;

Third sub-process flow 430 relates to an Uncategorized Card, in this instance "Conclusion," and the final page, the "Preview Page";

Fourth sub-process flow 440 is a series of sub-process flows each one relating to an Optional Card that can forming part of a Major Card which itself forms a section of the COPE Frame defining, in this instance the Minor Cards are "Optional Extra" as relating to a Major Card defining a Point within the content; and Fifth sub-process flow 450 is a series of sub-process flows each one relating to an Optional Card which forms part of a Minor Card and therein a Major Card which itself forms a section of the COPE Frame defining, in this instance the Optional Cards are "Optional Extra— Counter Point" and relate to a Major Card "Counter Point" defining a Counter Point to a Point made within the content.

Accordingly, a COPE Frame according to the embodiment of the invention is defined by one or more Major Cards with their associated one or more Minor Cards and Optional (or Extra) Cards. There are also Uncategorized Cards. The Optional Cards can be defined within the COPE Frame or added by user selection individually or in combination to provide additional functionality within specific places within the COPE Frame.

Major Cards may include, for example, Introductory Section, Main Point, and Counter-Point.

Minor Cards may include, for example, Point, Background, Evidence, Explanation, and Tie Back to Thesis.

Optional/Extra Cards may include, for example, Extended Background, Approach/Methods, and More Evidence+ More Explanation.

Uncategorized Cards may include, for example, Conclusion, Appendix, Executive Summary and Roadmap Points/Roadmap.

Each of these Cards not only has its own set of rules governing the reproducibility, mobility, and placement for example but also its own set of user interface features, layout, buttons, options, and choices. Accordingly, the inventors have established an architecture that allows the implementation of this "card" structure that not only allows the existing current set of cards to be employed in providing multiple COPE Frames but also allows new cards to be added as/when necessary in the future, according to specific logical rules, allowing for easy upgrading/expansion of CONFRASAPs according to embodiments of the invention.

It would be evident therefore that COPE Frames may therefore be generated that are related to a particular form of content, e.g. essay, of particular style, e.g. argumentative, and varying length, e.g. 1000 words, 2000 words, 5000 words wherein the COPE Frame is structured based upon the content, style and length such that for example a 1000 word argumentative essay may require the user to provide introduction, single point and counter-point and a conclusion whereas the COPE Frame for a 5000 word argumentative essay is structured establishing the introduction, body, five points with three counter-points, and a conclusion. Alternatively, a 2 page technical journal CORE Frame may define an abstract, introduction, prior art, theoretical basis, design, experiment, next steps, and conclusion.

Considering, for example, the Major Card "Introduction," then this is composed of a set of Minor Cards, for example Topic, Background, Thesis Statement, and Roadmap, with optional extras of Approach/Methods and Extended Background. This sequence of Minor Cards for Major Card "Introduction" is depicted in FIG. 5 with first sub-process flow 410. Of the Minor Cards Roadmap operates slightly differently to the other Minor Cards because if the "Topic Sentence" cards in the subsequent section is null, then they will be synced with the Roadmap Points in order; if the Roadmap Points are null, then they will be synced with the "Topic Sentence" points in the corresponding order. As well, from the Roadmap Points, the user can autogenerate the concluding paragraph. Considering these Minor Cards in order then as depicted below in respect of FIGS. 6 to 19 these when initially opened provide the user with a menu of potential opening phrases, placeholder text, and have associated with them one or more tips.

Considering initially Introduction: Topic then the "drop down menu" of potential opening phrases may include, for example:

[Insert your own . . . ]
The book, [insert title], by [insert author's name] is about
The article, [insert title], by [insert author's name] focuses on
An important question in the study of [insert topic] is
The significance of
One way of understanding
There is a debate among scholars on
A puzzle emerges in the analysis of
Scholars have disagreed about
The field research on
Important data suggests The placeholder text for Introduction: Topic may be, for example, "Jump right in! What's your focus?"

The CONFRASAPs tips for Introduction: Topic may include, for example:

"Clearly state the main thing you're writing about";
"Give the name of a book or author or puzzle or question you're writing about";
"Be precise and concise";
"You'll elaborate later".

The CONFRASAPs definition for "Topic" may be, for example, "What you have been asked to write about."

An educator-level user will be able to customize the template and edit the component parts of the Minor Cards: placeholder text, transitions/opening phrases, and tips.

Now considering Introduction: Background as the next Minor Card displayed to the user then rather than a menu of potential opening phrases they are presented with a menu of transitional phrases, placeholder text, a definition, tips, and an option to "Insert More Background," as a contextually-specific option. In this instance, the menu of transitional phrases may include, for example:

[Insert your own . . . ]
Some history of this topic includes
The question is important because
important background to bear in mind is
Before going on, it is important to understand
On the one hand . . . , [and on the other hand . . . ]
The context for this discussion includes
There are various interpretations of
This line of inquiry matters because
One common scholarly interpretation of this book/article is
There is a debate between scholars about The placeholder text for Introduction: Background in this instance may be, for example, "What special vocabulary or information do you need to share before going on?" The definition, for example, may be: "Information that sets the stage for whatever comes next." Similarly the tips may now include, but not be limited to:

"Say why you're focusing on this issue (and it's not good enough to say that this was just an assignment from your teacher or prof!)";
"Define any terms or ideas here"; and
"Don't give away all the details yet, but just say why this topic matters."

Similarly, other Minor Cards associated with the Introduction such as Thesis Statement are comprised of transitions, a definition, tips, and placeholder text as well as contextually-specific buttons to insert optional Minor Cards. In the case of Thesis Statement, for example, the contextually-specific option is for a Minor Card focusing on Methods/Approach.

In contrast some Minor Cards, such as the Roadmap Points which repeat or form a linked sequence, such as First Point, Intermediate Point, Final Point etc. may comprise varying transitional phrases but similar tips and placeholder text. For example Table 1 below shows examples for the transitional phrases for such linked Minor Cards, i.e. First Point, Intermediate Point, and Final Point.

TABLE 1

Example of Linked Transitional Phrases

| | |
|---|---|
| First Point | [Insert your own . . . ] |
| | First, I describe/argue/examine/analyze |
| | The argument begins with |
| | The argument starts by |
| | The analysis commences with |
| | This thesis becomes apparent in an analysis of |
| | The main points that build this case begin with |
| | I divide my argument into several parts, first is |
| | I build my interpretation starting with |
| | My case for this stand builds from |
| | The analysis proceeds as follows: |
| Intermediate Point | [Insert your own . . . ] |
| | I then describe/argue/examine/analyze |
| | The argument then moves on to |
| | The analysis then proceeds to |
| | A subsequent point is |
| | Another idea to explore is |
| | Yet another piece of the puzzle is |
| | In light of these ideas, it makes sense also to explore |
| | The further elements that support this insight are |
| | Subsequently, I establish |
| | I also analyze |
| Final Point | [Insert your own . . . ] |
| | Finally, I describe/argue/examine/analyze |
| | I finally describe/argue/examine/analyze |
| | The argument concludes with |

TABLE 1-continued

Example of Linked Transitional Phrases

The analysis ends by
A closing point is
One last idea to explore is
The ultimate piece of the puzzle is
In light of these ideas, I close with
The last elements that supports this insight are
To end, I establish
Lastly, I analyze In such a linked sequence the common placeholder text may be ""Keep it short and sweet; what is the %{ordinal} point you will develop to establish your thesis?" wherein %{ordinal} varies to reflect for example, first, second, third, fourth etc. as the number of roadmap points may be adjusted by the user. The common definition may be, for example: ""The section of your introduction that briefly indicates the main points your essay draft will raise to establish your thesis." The tips in such an instance may include, for example:

"Set the expectations of what will follow in your essay by listing the main points you will later develop in detail";

"1 or 2 sentences per point here; just assert, don't argue yet"; and

"Save your best point to the end."

Minor Cards may include a series of buttons directly accessible or via a drop-down menu/pop-up menu as known within the art. For example, the contextually generated COPE Frame for an essay established in dependence upon user input and CONFRASAP rules may define that there should be 3 Roadmap Points (e.g. First, Intermediate, and Final) but the user during their activities determines that they have an additional point that they want to make and accordingly may select "Add New Point" or finding that they are short of a Roadmap Point may select "Remove Point." The ability to add/remove points from the Introductory section will sync automatically with the Body section. For instance, if a user chooses to add a new point in the Roadmap, then there will be a corresponding new Minor Card Point added to the body.

Accordingly, embodiments of the invention may adjust the sequence of Minor Cards automatically determined based upon the user's actions within the CONFRASAP. For example, the rules given in Table 2 might be applied. Such rules, may for example, provide the user with a CONFRASAP that makes writing/organizing easier whilst automatically generating an essay-outline. In other instances, the CONFRASAP may make amendments/adjustments to sequencing of Minor Cards and/or inclusion—removal of Minor Card generating paragraphing based upon contextually aware rules. Examples of such contextually driven amendments/adjustments are given in Table 3.

TABLE 2

Examples of Contextual ONFRASAP Rules

| | |
|---|---|
| Rule 1 | IF Point sections are empty, THEN those sections will inherit the text entered into the corresponding Roadmap Point section. |
| Rule 2 | IF Roadmap Points are empty, THEN those sections will inherit the text entered into the corresponding body Points. |
| Rule 3 | IF users do not add the methods/approach section or the Extended Background section, THEN all of the above component parts become one, single autogenerated introductory paragraph for the essay as a whole.<br>Topic + Background + Thesis Statement + Roadmap = Introductory Paragraph |
| Rule 4 | IF users do add the Methods/Approach section but not the Extended Background section, THEN all of the above component parts become two auto-generated introductory paragraphs (the introductory section) for the essay as a whole, broken up as follows:<br>Topic + Background + Thesis Statement = Introductory Paragraph #1<br>Methods/Approach + Roadmap = Introductory Paragraph #2 |
| Rule 5 | IF users do add the Extended Background section but not the Methods/Approach section, THEN all of the above component parts become two autogenerated introductory paragraphs (the introductory section) for the essay as a whole, broken up as follows:<br>Topic + Background + Thesis Statement + Roadmap = Introductory Paragraph #1<br>Extended Background = Introductory Paragraph #2 (note: could be multiple paragraphs, i.e. Introductory Paragraphs #2, #3, #4 etc.) |
| Rule 6 | IF users add the Extended Background section and the Methods/Approach section, THEN all of the above component parts become autogenerated introductory paragraphs (the introductory section) for the essay as a whole, broken up as follows:<br>Topic + Background + Thesis Statement = Introductory Paragraph #1<br>Methods/Approach + Roadmap = Introductory Paragraph #2<br>Extended Background = Introductory Paragraph #3 (Note: could be multiple paragraphs, i.e. Introductory Paragraphs #3, #4, #5 etc.) |
| Rule 7 | IF users choose "more evidence + more explanation" in any body point or counter point, THEN a paragraph break will be inserted between the first evidence + explanation and the more evidence + more explanation. |
| Rule 8 | IF a user chooses more than one "more evidence + more explanation," THEN a paragraph break will be inserted between each "more explanation" and "more evidence" sections. |

Considering now, for example, the Minor Card "Point," then this is itself composed of a set of Minor Cards, for example Topic Sentence, Background, Evidence, Explanation and Tie Back to Thesis Statement, with optional extras of More Evidence+More Explanation and Extended Background associated with the Background, Evidence, and Explanation Minor Cards. The Tie Back to Thesis Statement Minor card has associated with it optional extra Major Card of Counterpoint, which would insert a Counterpoint after the Point. This sequence of Minor Cards for Point is depicted in FIG. 5 with second sub-process flow 420.

The Major Card "Counterpoint" is an optional section that is inserted if a user chooses the "Insert Counterpoint" option from any "Tie Back to Thesis" card or box within the Minor Cards of a "Point". If the user chooses to "Insert Counterpoint," then it is inserted right after the "Tie Back to Thesis" and before the next Main Point and consists, for example, of Minor Cards Topic Sentence*, Background*, Evidence*, Explanation* and Tie Back to Thesis* with optional extras of Extended Background, and More Evidence+More Explanation. Minor Cards denoted above with an "*" are conceptually the same as the other instances of these Minor Cards, such as for example those that make up a standard Main Point, but the specific elements within each are slightly different (transitional phrases, definitions, placeholder text, and tips). For example the transitional phrases within the Counterpoint may include, for example:

[Insert your own . . . ]
However,
On the other hand,
In contrast,
By comparison,
On the contrary,
An opposing view is
An alternative perspective
One qualification to this position is
A condition/caveat/limitation to note is
A necessary proviso is In contrast the Counterpoint Background* transitional phrases now differ from those given above for Background and may comprise for example:

It is important to know another side
To understand this opposing point,
A key notion to appreciate
One alternative idea is
Another lesson to take is
This idea makes sense in the context of
To appreciate the counter point, we need to keep in mind
The background to this counter point is
Some important context is
Significant prior information includes
We can see that Now referring to FIG. 6 there are depicted exemplary user profile interface screens, first to fourth screens 600A to 600D, presented to a user within a software application supporting CONFRASAPs according to an embodiment of the invention. Accordingly, these depict:

First screen 600A wherein the user selects whether they are a student or educator;
Second screen 600B wherein the user on first time entry after registration is prompted to complete their profile; and
Third screen 600C wherein users user can change their profiles.

Optionally, within the profile setting a user may be able to select a name/avatar for the CONFRASAP rather than any such default name, avatar associated with the CONFRASAP upon their registration. In some embodiments of the invention an institution may define this for all of their users, such as "Rodney" for Carleton University in Ottawa, Ontario, Canada after "Rodney the Raven" their mascot. Now referring to FIG. 7 there are depicted exemplary user profile interface screens, first to fourth screens 700A to 700D, presented to a user establishing a custom framework within a software application supporting CONFRASAPs according to an embodiment of the invention. Accordingly, these depict a scenario wherein the user is establishing the new custom framework within the CONFRASAP wherein they enter framework title, target word count, the name of any associated instructor, the course, a due data, any keywords, and have the ability to add an attachment. In this manner the user can create a contextually aware framework specific to a particular task associated with a specific course within an institutional environment as normal users would be generally selecting from the default frameworks. As such the screens show:

First screen 700A wherein the user has selected to edit the text box associated with "What should I write?" as the prompt indicating the placeholder text with respect to a Topic card;
Second screen 700B wherein an educator-enabled user is selecting placeholder text with respect to customizing the options to appear in the Topic card, e.g. default options;
Third screen 700C wherein the user has changed the placeholder text from the default "Jump right in! What's your focus," to the customized "Remember to begin your draft with a clear sentence that gives the author's name and the name of the play you will discuss." It also shows an educator-enabled user adding a custom tip with respect to the Topic card; and
Fourth screen 700D wherein the modified Topic card is displayed to the user.

As depicted in each of first to fourth screens 700A to 700D the educator user can toggle between "Tips" and "Transitions" so that both aspects of the card being modified can be adjusted and included with the card as part of the custom framework. Now referring to FIG. 8 there are depicted exemplary user profile interface screens, namely first to fourth screens 800A to 800D respectively, presented to a user accessing active content within a software application supporting CONFRASAPs according to an embodiment of the invention. Accordingly, these show:

First screen 800A wherein the user can filter active content being drafted or completed by due date, word count, % complete, content title, course title, instructor, and keywords;
Second screen 800B wherein, the user is presented with content sorted by due date wherein due dates within a predetermined time period, e.g. 5 days, 1 week, etc. may be colour coded/highlighted to the user;
Third screen 800C wherein the user can filter by criteria such as due soon, <1000 words, <2000 words, <50% complete etc.; and
Fourth screen 800D wherein the user has selected "Options" in respect of the content "Reader Response Theory" in their sorted or filtered listing which provides a set of options as defined by the CONFRASAP including, preview, email self, share, create copy, download as text, download as HTML, download as docx (Microsoft Word format), view attachment, revise details. FIGS. 9 to 12 depict exemplary interface screens for a user managing active content within a software application supporting CONFRASAPs according to an embodiment of the invention. Within FIG. 9 first to fourth screens 900A to 900E depict:
First screen 900A depicts a pop-up screen relating to creating a new item of content; and
Second screen 900B depicts the interface for creating a new, customized template.

Figure 10A:
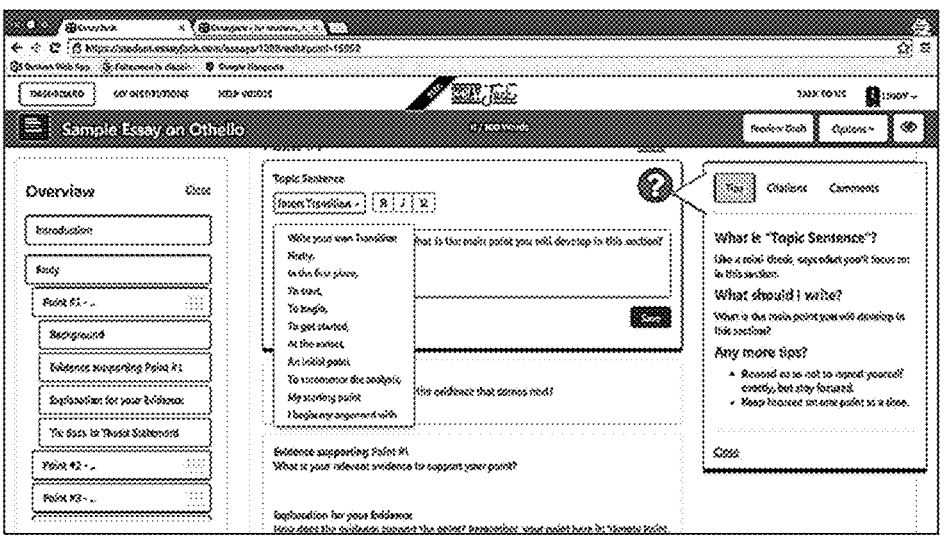
Figure 10B:
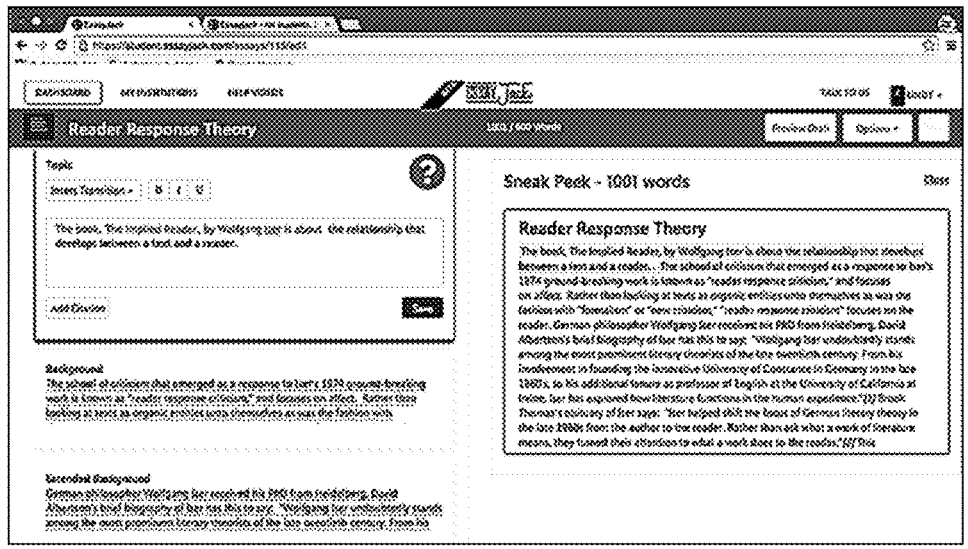
Figure 10B:
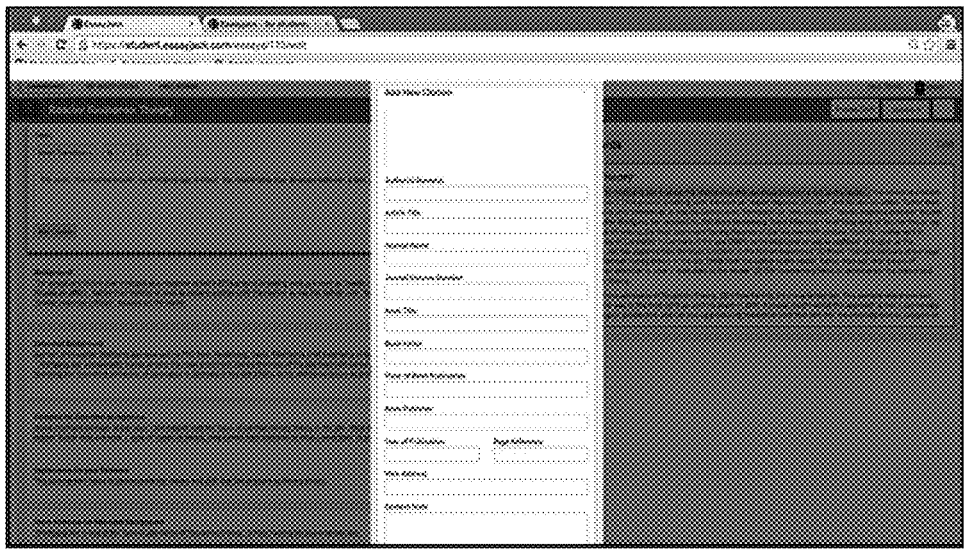
Figure 10B:
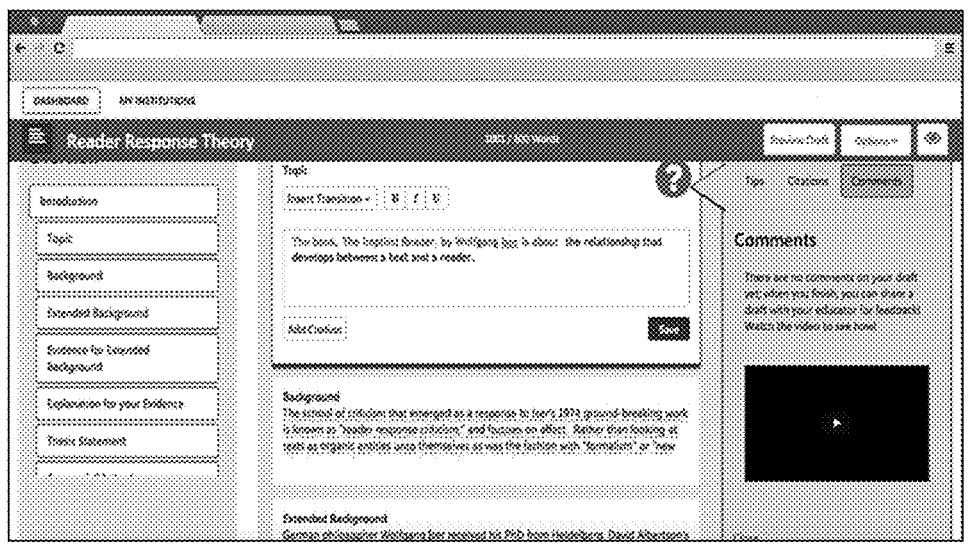

Now referring to FIGS. 10A and 10B there are depicted first to fifth screens 1000A to 1000E depict:

First screen 1000A wherein a user has logged in and selected to create a new item of content using a customized template (such as one created through the process depicted in screen 900B). As an example, this user is choosing the customized framework "IELTS Writing Task2" in order to pre-populate content according to that customized framework's parameters;

Second screen 1000B depicts a user generating content from a framework wherein they selected from the left hand "Overview" menu "Point" and are then provided on the right hand side of the screen with the cards but now with any content added by the user to these where they are also able to select a transition and add a citation which will be subsequently added to the finished document according to the rules of the framework such as at the end of the document and in the citations tab where citations can be edited;

Third screen 1000C wherein the user in editing a draft of content being generated according to a framework has elected to view a "sneak peek" of how the final content will be presented, offering an alternative screen view for composing in the main card text boxes;

Fourth screen 1000D wherein the user sees a pop up menu to add citation information for quoted or paraphrased material; and Fifth screen 1000E wherein the user can see and manage comments to the "Topic" card within the "Introduction" which refers to comments an educator might make to a user's content through the educator-enabled reviewing functions.

Figure 11:
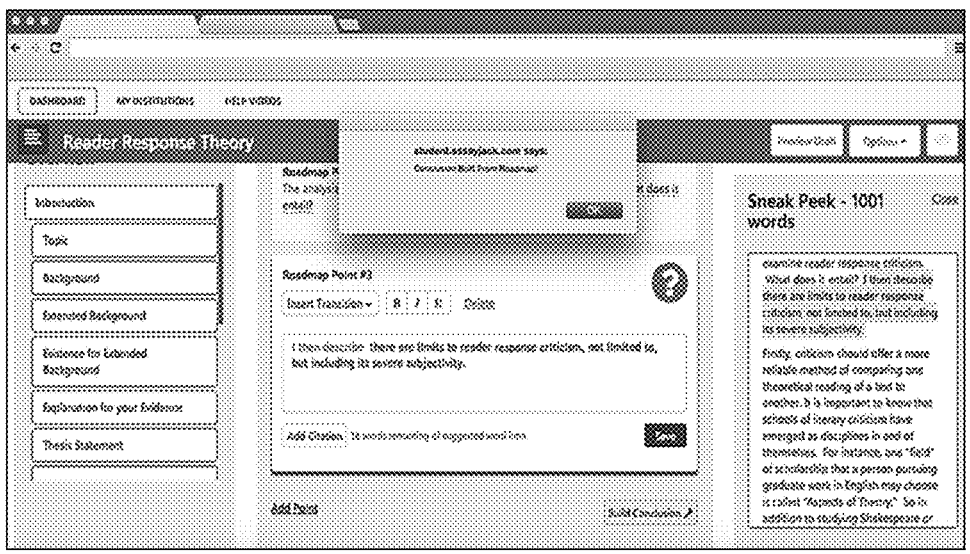
Figure 11:
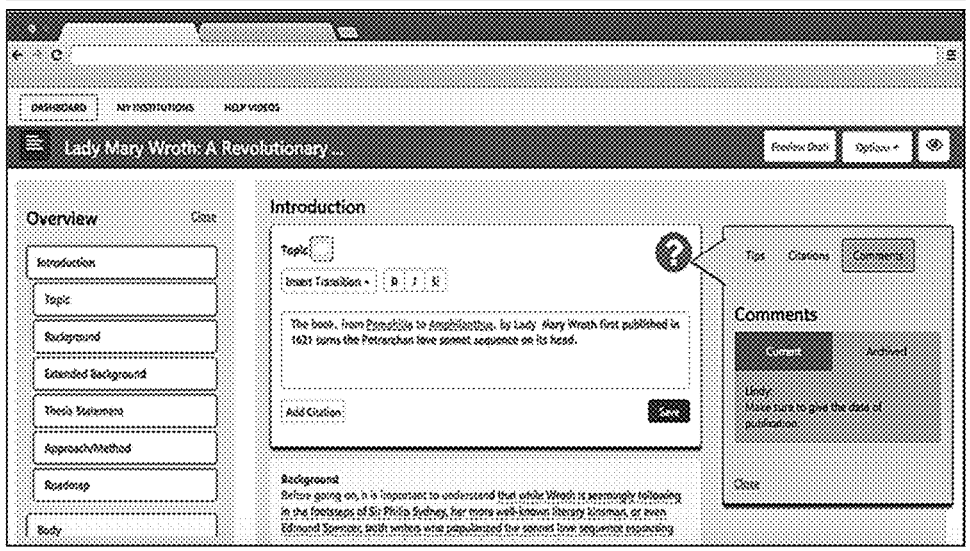
Figure 11:
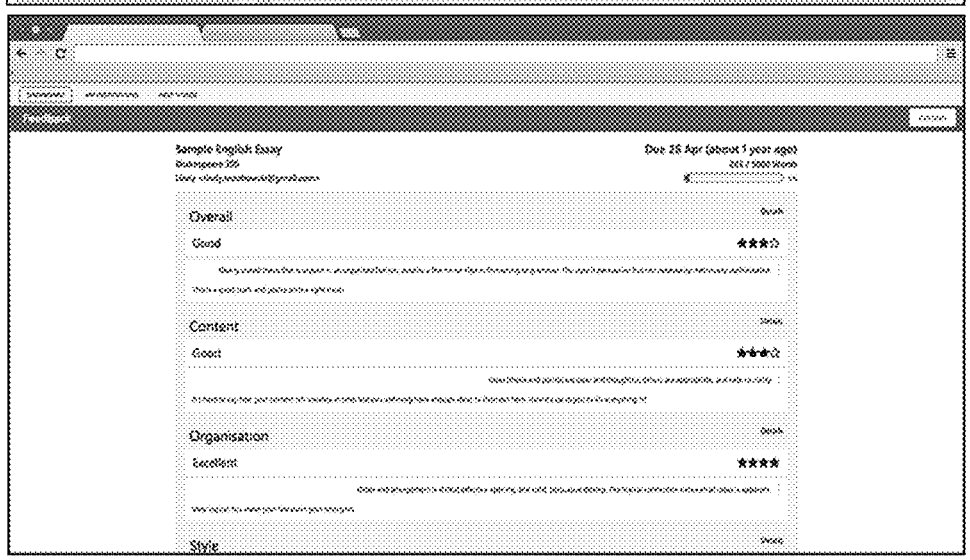

Now referring to FIG. 11 first to fourth screens 1100A to 1100C depict:

First screen 1100A wherein the user has accessed the Conclusion card and has displayed the associated tips and has selected "Build Conclusion" which provides options to the user to pull elements they entered from the Introduction or Body to provide a starting structure to the conclusion;

Second screen 1100B wherein a user can see educator-enabled comments against an element of the content wherein the CONFRASAP highlights the section of text the comment is associated with together with an indicator, where in this instance the comment relates to the Topic element of the framework; and Third screen 1100C depicts a review screen wherein the educator user has made ratings and provided feedback against the content drafted by another user using the CONFRASAP and has rated predetermined aspects such as overall grading, content, organization, and style where against the selected grade the user can make comments.

Figure 12A:
Figure 12A:
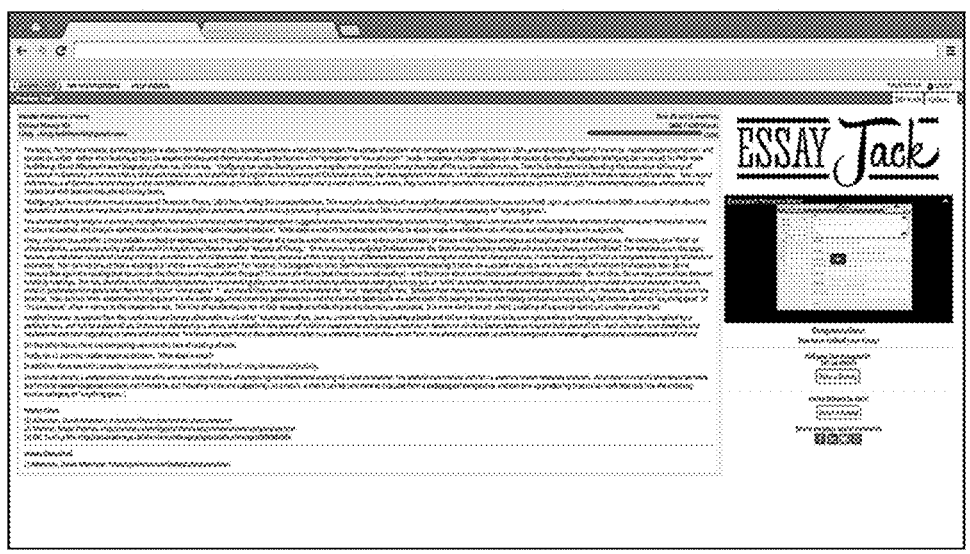
Figure 12A:
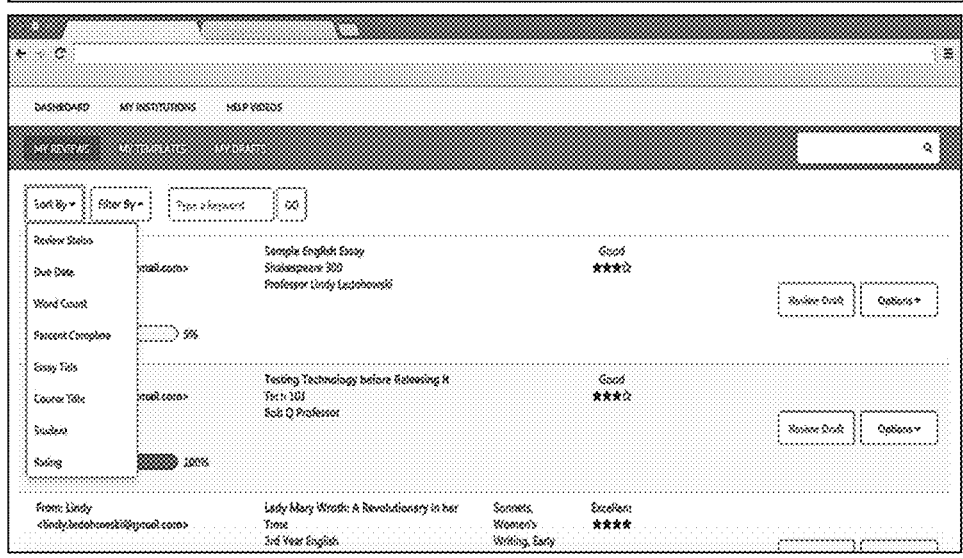
Figure 12B:
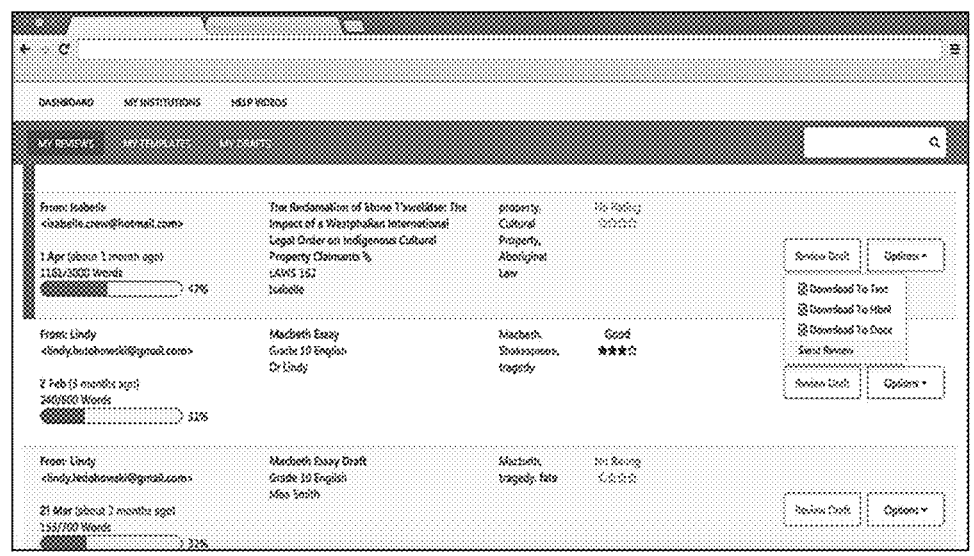

Now referring to FIGS. 12A and 12B there are depicted first to fourth screens 1200A to 1200D depict:

First screen 1200A wherein a user has received an item of content for review prior to publication/grading/export for example wherein the displayed content includes markers for sections within the framework and a section reference guide for span-specific comments (which will appear for the user as in screen 1100B);

Second screen 1200B wherein a user has finished drafting the content and any associated review wherein the completed content is displayed with citations at the bottom of the page, a video segment, a request for feedback or bug reporting, and links to email and social networks for letting a friend know about the CONFRASAP application;

Third screen 1200C wherein an educator is able to sort received content by different criteria including, for example, review status, due date, word count, % complete, content title, course title, student, keywords and rating; and Fourth screen 1200D wherein an educator having completed a review can select an option button associated with the content and, in this instance, share the reviewed content (e.g. with the user) and or download it.

Within the embodiments of the invention depicted supra a user is presented with a Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one or more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
presenting to a user upon an electronic device comprising at least a display and a microprocessor a predetermined interactive writing framework for generating an item of content in a sequentially structured manner; wherein
data for generating the item of content has been entered non-sequentially by the user into the predetermined interactive writing framework;
the predetermined interactive writing framework has been established in dependence upon a context selected by the user; and
the predetermined interactive writing framework comprises a plurality of cards.

2. The method according to claim 1, wherein
the plurality of cards comprises:
a linked sequential series of a plurality of major cards defined by the context of the predetermined interactive writing framework;
a plurality of minor cards;
a plurality of optional additional cards; wherein
each major card comprises a predetermined linked sequential sequence of a subset of the plurality of minor cards and a subset of the optional additional cards;
each of the plurality of cards has its own set of rules governing its reproducibility, mobility within the predetermined interactive writing framework, and placement within the predetermined interactive writing framework; and
the user may enter data into any minor card of any major card independent of whether any data has been entered into any other minor card of any major card.

3. The method according to claim 1, wherein
the predetermined interactive writing framework provides the user with predetermined transition phrase options for starting each sequential element in the predetermined interactive writing framework; and any transition phrase option selected by the user forms part of the item of content.

4. The method according to claim 1, wherein
the plurality of cards within the predetermined interactive writing framework are defined by selecting a type of content, a length of content, and a style of content; and
each of the plurality of major cards, the plurality of minor cards, and the plurality of optional additional cards has its own set of user interface features, layout, buttons, options, and choices.

5. The method according to claim 1, wherein
the predetermined interactive writing framework at least one of:
  employs different subsets of the plurality of cards for each framework generated by a user; and
  allows a new card to be added to the plurality of cards wherein the new card is added according to a set of specific logical rules.

6. A method comprising;
presenting to a first user upon an electronic device comprising at least a display and a microprocessor an item of content, the item of content generated by a second user using a predetermined interactive writing framework for generating the item of content in a sequentially structured manner with the data for generating the item of content entered non-sequentially by the second user into the predetermined interactive writing framework, the predetermined interactive writing framework established in dependence upon a context selected by the second user;
providing to the first user upon the electronic device the ability to at least one review, rate, grade, and comment upon the item of content; wherein
the predetermined interactive writing framework comprises a plurality of cards.

7. The method according to claim 6, wherein
the plurality of cards comprise:
  a linked sequential series of a plurality of major cards defined by the context of the predetermined interactive writing framework;
  a plurality of minor cards; and
  a plurality of optional additional cards; wherein
each major card comprises a predetermined linked sequential sequence of a subset of the plurality of minor cards and a subset of the plurality of optional additional cards;
each of the plurality of cards has its own set of rules governing its reproducibility, mobility within the predetermined interactive writing framework, and placement within the predetermined interactive writing framework;
each of the plurality of major cards, the plurality of minor cards, and the plurality of optional additional cards has its own set of user interface features, layout, buttons, options, and choices;
the second user may enter data into any minor card of any major card independent of whether any data has been entered into any other minor card of any major card; and
the plurality of cards within the predetermined interactive writing framework are defined by second user selections with respect to a type of content, a length of content, and a style of content.

8. The method according to claim 6, wherein
the predetermined interactive writing framework provides the second user with predetermined transition phrase options for starting each sequential element in the predetermined interactive writing framework wherein any transition phrase option selected by the second user then forms part of the item of content; and
the first user whilst at least one of reviewing, rating, grading, and commenting upon the item of electronic content can view a predetermined portion of a hierarchy of a context-specific writing framework which has the predetermined transition phrase options generated by the context-specific writing framework either removed or highlighted allowing the first user to view that portion of the item of electronic content actually entered by the second user.

9. Computer instructions stored within a non-volatile, non-transitory memory for execution by a microprocessor, wherein the computer instructions cause a process to be executed comprising:
  receiving from a user an indication of a context associated with an item of content;
  presenting to the user upon an electronic device comprising at least a display and the microprocessor a predetermined interactive writing framework for generating the item of content in a sequentially structured manner from data entered non-sequentially by the user into the predetermined interactive writing framework, the predetermined interactive writing framework established in dependence upon the context;
  receiving from the user a plurality of first selections relating to user generated content to form a first predetermined portion of the item of content and in association with each first selection of the first plurality of selections content data;
  receiving from the user a plurality of second selections relating to user generated content to form a second predetermined portion of the item of content, each second selection of the plurality of second selections associated with an item of predetermined linking data selected by the user; and
  generating the item of content in dependence upon the predetermined interactive writing framework, the content data and the linking data; wherein
  the predetermined interactive writing framework comprises a plurality of cards.

10. The computer instructions according to claim 9, wherein presenting the user with a predetermined interactive writing framework comprises:
  presenting a linked sequential series of major cards defined by the context of the framework, the major cards being a predetermined subset of a plurality of major cards forming part of the plurality of cards;
  presenting as part of each major card a predetermined linked sequential sequence of minor cards, the minor cards being a predetermined subset of a plurality of minor cards forming part of the plurality of cards; wherein
  each first selection of the plurality of first selections comprises selection of a minor card;
  each of the plurality of cards has its own set of rules governing its reproducibility, mobility within the predetermined interactive writing framework, and placement within the predetermined interactive writing framework;
  each of the plurality of major cards, the plurality of minor cards, and the plurality of optional additional cards has its own set of user interface features, layout, buttons, options, and choices;

the user may select any minor card in any order and enter data into selected minor card independent of whether any data has been entered into any other minor card of any major card;

the plurality of cards within the predetermined interactive writing framework are defined by user selected with respect to a type of content, a length of content, and a style of content.

11. The computer instructions according to claim 9, wherein the process further comprises;

presenting the user with an option to add one or more optional additional minor cards to a major card, the one or more optional additional cards being a subset of a plurality of optional additional cards forming part of the plurality of cards; and presenting the user with the option to reorder, add, or delete one or more minor cards forming part of the predetermined linked sequential sequence of minor cards associated with a major card.

12. The computer instructions according to claim 9, wherein the predetermined interactive writing framework provides the user with predetermined transition phrase options via one or more menus for starting each sequential element in the framework;

each selected predetermined transition phrase option becomes a second selection of the plurality of second selections; and any transition phrase option selected by the user forms part of the item of content.

13. The computer instructions according to claim 9, wherein the user is provided with at least one of:

access to tips relating to each sequential element in the predetermined interactive writing framework;

a definition relating to each sequential element in the predetermined interactive writing framework; and placeholder text as a prompt for each sequential element in the predetermined interactive writing framework.

14. The computer instructions according to claim 9, wherein the process further comprises;

receiving user framework data comprising a type of content, a length of content, and a style of content, each established by the user;

selecting the predetermined interactive writing framework in dependence upon at least the user framework data;

autogenerating component parts of the predetermined interactive writing framework in dependence upon user framework data, each component part comprising a major card of the plurality of cards and a predetermined linked sequential set of minor cards of the plurality of cards, where the major card and the predetermined linked sequential set of minor cards are defined by the context of the predetermined interactive writing framework.

15. The computer instructions according to claim 9, wherein a first predetermined portion of the predetermined interactive writing framework is modified in dependence upon actions by the user in respect of a second predetermined portion of the predetermined interactive writing framework.

16. Computer instructions stored within a non-volatile, non-transitory memory for execution by a microprocessor, wherein the computer instructions cause a process to be executed comprising:

a) opening a software application upon an electronic device comprising at least a display and the microprocessor, the software application providing a graphical user interface (GUI) to a user in respect of their generating an item of content;

b) retrieving from a memory data relating to a predetermined interactive writing framework based upon selection by a user of a context of an item of content and a document type of the item of content to be prepared by the user using the software application, the predetermined interactive writing framework for generating the item of content in a sequentially structured manner from data entered by the user non-sequentially;

c) displaying to the user within the GUI a first predetermined portion of the predetermined interactive writing framework;

d) receiving from the user a first selection within the first predetermined portion of the predetermined interactive writing framework;

e) receiving from the user a second selection within a second predetermined portion of the predetermined interactive writing frame displayed to the user in dependence upon the first selection;

f) determining whether the second selection meets a first predetermined criterion or a second predetermined criterion, wherein upon determining that the second selection meets the first predetermined criterion the software application receives content data entered by the user and stores the content data in association with framework data relating to the first selection and the second selection;

upon determining that the second selection meets the second predetermined criterion the software application stores at least one of the second selection and linking data in association with framework data relating to the first selection;

g) repeating steps (c) to (e) until one first selection relates to a predetermined function; and h) performing the predetermined function; wherein the predetermined interactive writing framework comprises a plurality of cards.

17. The computer instructions according to claim 16, wherein the predetermined function is selected from a group comprising exiting the software application, displaying the current item of content based upon the entries made by the user within the predetermined interactive writing framework, printing the current item of content based upon the entries made by the user within the predetermined interactive writing framework, and sending the current item of content based upon the entries made by the user within the predetermined interactive writing framework to another user.

18. The computer instructions according to claim 16, wherein the plurality of cards comprise:

a linked sequential series of a plurality of major cards defined by the context of the predetermined interactive writing framework;

a plurality of minor cards; and a plurality of optional additional cards; wherein each major card comprises a predetermined linked sequential sequence of a subset of the plurality of minor cards and a subset of the plurality of optional additional cards;

each of the plurality of cards has its own set of rules governing its reproducibility, mobility within the predetermined interactive writing framework, and placement within the predetermined interactive writing framework;

each of the plurality of major cards, the plurality of minor cards, and the plurality of optional additional cards has its own set of user interface features, layout, buttons, options, and choices;

the user may enter data into any minor card of any major card independent of whether any data has been entered into any other minor card of any major card; and the plurality of cards within the predetermined interactive writing framework are defined by user selected with respect to a type of content, a length of content, and a style of content.

19. The computer instructions according to claim 18, wherein each of the plurality of major cards, the plurality of minor cards, and the plurality of optional additional cards has its own set of user interface features, layout, buttons, options, and choices.

\* \* \* \* \*